US011029162B2

(12) United States Patent
Pfeifle et al.

(10) Patent No.: US 11,029,162 B2
(45) Date of Patent: Jun. 8, 2021

(54) GATEWAY COST DATA SETS FOR FAST ROUTING

(71) Applicant: HERE GLOBAL B.V., Eindhoven (NL)

(72) Inventors: Martin Pfeifle, Seewald (DE); Jonghyun Suh, Bad Soden (DE); Tomas Jurco, Kosice (SK); Andre Reichert, Darmstadt (DE)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/306,939

(22) PCT Filed: Jun. 7, 2016

(86) PCT No.: PCT/EP2016/062860
§ 371 (c)(1),
(2) Date: Dec. 4, 2018

(87) PCT Pub. No.: WO2017/211387
PCT Pub. Date: Dec. 14, 2017

(65) Prior Publication Data
US 2019/0145785 A1    May 16, 2019

(51) Int. Cl.
*G01C 21/32* (2006.01)
*G01C 21/34* (2006.01)
*G01C 21/00* (2006.01)

(52) U.S. Cl.
CPC ......... *G01C 21/32* (2013.01); *G01C 21/3461* (2013.01); *G01C 21/38* (2020.08)

(58) Field of Classification Search
CPC ............................ G01C 21/32; G01C 21/3461
See application file for complete search history.

(56) References Cited

U.S. PATENT DOCUMENTS 8,014,941 B2    9/2011  Nagel et al.
2008/0091340 A1    4/2008  Milstein et al.
(Continued)

FOREIGN PATENT DOCUMENTS

| EP | 2 685 215 A1 | 1/2014 |
| EP | 2 951 532 B1 | 10/2019 |
| JP | 2009 002896 A | 1/2009 |

OTHER PUBLICATIONS

International Search Report and Written Opinion for Application No. PCT/EP2016/062860 dated Feb. 27, 2017, 13 pages.
Flinsenberg, L. et al., *Creating Graph Partitions for Fast Optimum Route Planning*, 2004 WSEAS Multiconference, Austria (Feb. 13-15, 2004) 6 pages.
(Continued)

*Primary Examiner* — Marthe Y Marc-Coleman
(74) *Attorney, Agent, or Firm* — Alston & Bird LLP

(57) ABSTRACT

A method and apparatus are provided for creating a navigation data source for use with a navigation system configured for route determination based on associated costs. The navigation data source comprises a cost data set associated with a navigation data set that represents a map of a geographic region and defines at least a plurality of gateways. Each of the gateways of the plurality of gateways may be associated with a position located within the geographic region and associated with a gateway of a further navigation data set representing a map of another geographic region. The cost data set comprises cost data that defines, for at least some of the possible gateway pairs of the plurality of gateways, at least a cost value with each cost value indicating a cost for a route between gateways of a respective gateway pair.

20 Claims, 12 Drawing Sheets

(56) References Cited

U.S. PATENT DOCUMENTS

| | | | |
|---|---|---|---|
| 2010/0100309 A1 | 4/2010 | Hosoi et al. | |
| 2010/0262359 A1 | 10/2010 | Motoyama | |
| 2010/0299065 A1* | 11/2010 | Mays | G01C 21/206 701/533 |
| 2011/0118972 A1* | 5/2011 | Boschker | G08G 1/0969 701/532 |
| 2013/0218453 A1* | 8/2013 | Geelen | G01C 21/3626 701/410 |
| 2014/0107921 A1 | 4/2014 | Delling et al. | |
| 2014/0136107 A1 | 5/2014 | Pfeifle | |
| 2015/0149078 A1* | 5/2015 | Profous | G01C 21/3446 701/426 |
| 2015/0168171 A1 | 6/2015 | Tanizaki et al. | |
| 2015/0356759 A1 | 12/2015 | Delling et al. | |
| 2015/0377632 A1 | 12/2015 | Pfeifle | |

OTHER PUBLICATIONS

NDS Association [online] [retrieved Oct. 25, 2019]. Retrieved via the Internet: https://web.archive.org/web/20180913154251/http://nds-association.org/ (dated Sep. 13, 2018) 12 pages.

SQLite Home Page [online] [retrieved Oct. 25, 2019]. Retrieved via the Internet: https://web.archive.org/web/20181202214420/https://www.sqlite.org/index.html (Dec. 2, 2018) 2 pages.

Ditjkstra's algorithm—Wikipedia [online] [retrieved Oct. 25, 2019]. Retrieved via the Internet: https://web.archive.org/web/20181202142533/https://en.wikipedia.org/wiki/Dijkstra's_algorithm. (dated Dec. 2, 2018) 11 pages.

A* search algorithm—Wikipedia [online] [retrieved Oct. 25, 2019], Retrieved via the Internet: https://web.archive.org/web/20181202142114/https://en.wikipedia.org/wiki/A*_search_algorithm (dated Dec. 2, 2018) 11 pages.

Goldberg, A. V. et al., *Computing Point-to-Point Shortest Paths From External Memory*, ALENEX/ANALCO Conference (Jan. 2005) 26-40.

* cited by examiner

GATEWAY COST DATA SETS FOR FAST ROUTING

CROSS-REFERENCE TO RELATED APPLICATIONS

The present application is a national phase entry of International Application No. PCT/EP2016/062860, filed Jun. 7, 2016, which is incorporated herein by reference in its entirety.

FIELD OF THE INVENTION

The invention relates to the field of navigation systems and more specifically to the creation and provision of cost data sets for navigation data sets representing maps of geographic regions and defining gateways for providing links with further navigation data sets.

BACKGROUND OF THE INVENTION

There are two core functionalities, which modern navigation databases should fulfill. Firstly, it should be possible to update the databases efficiently. Secondly, it should be possible to compute good or even optimal routes efficiently. Thus, efficient map updating and efficient route computing are critical to modern navigation systems.

On the one hand, in order to allow efficient map updating it is beneficial to divide the navigation data of the navigation system into navigation data sets which can be updated independently. For example, each navigation data set represents an independent map of a specific geographic region like a set of countries, a country, a set of states or a state. The smaller the geographic regions maps of which are represented by the navigation data sets, the more efficient the navigation data can be updated by updating only the navigation data set(s) representing the to be updated map(s).

On the other hand, a navigation database should support efficient long-distance routing. For instance, it should be possible to compute a route from Madrid to Moscow within a few seconds even if the underlying database is divided into several of the above mentioned independent navigation data sets. However, the more divided the navigation data of the navigation system into navigation data sets, the more navigation data sets have to be accessed for route computing which renders the route computing more complex, as more time-expensive file-open, seek and read operations have to be carried out by the routing algorithm.

SUMMARY OF SOME EMBODIMENTS OF THE INVENTION

It may thus be an object of the invention to present a solution which allows dividing a navigation database into small and independently updatable navigation data sets while still allowing efficient routing. In particular, it may be achieved that there is less or even no degeneration or degradation of routing performance after updating single navigation data sets. In addition, it may be achieved that updating a single navigation data set does not require any changes in other navigation data sets.

According to a first aspect of the invention a navigation data source is presented, the navigation data source comprising: a cost data set associated with a navigation data set, the navigation data set representing a map of a geographic region and defining a plurality of gateways, each of the gateways of the plurality of gateways being associated with a position at the geographic region and being associable with a gateway of a further navigation data set representing a map of a further geographic region, wherein the cost data set comprises cost data, the cost data defining for at least a part of possible gateway pairs of said plurality of gateways at least a cost value each, the cost value indicating a cost for a route between gateways of a respective gateway pair.

The navigation data source may be or may comprise any data source which is suitable for storing and/or transmitting navigation data. Examples of such a navigation data source are one or more files and/or one or more databases, in particular one or more files and/or one or more databases according to or at least partially compatible with the Navigation Data Standard (NDS) which is standardized by the NDS association. The website of the NDS association is presently available under the following link: http://www.nds-association.org.

For example, the navigation data source is a navigation database (e.g. a navigation database of a navigation device, e.g. a NDS database of a navigation device). The navigation database may comprise different sub-databases (e.g. NDS product databases) for storing navigation data sets of different types, e.g. for maps of different levels of detail. A navigation database may for example be a SQL (Structured Query Language) database (e.g. a SQLlite database). Alternatively or additionally, the navigation data source may be a navigation data file, for example a navigation data file for updating a navigation database of a navigation device (e.g. a NDS database of a navigation device). Example file formats for a navigation data file are the Physical Storage Format (PSF) as standardized by the NDS association, SQLlite data file format and/or Geographic Data Files (GDF) as standardized by the International Organization for Standardization (ISO, e.g. ISO GDF 4.0, formally referred to as ISO14825:2004, or ISO GDF 5.0, formally referred to as ISO14825:2011).

The navigation data source may comprise one or more cost data sets. For example, a cost data set may be or may comprise a sub-database of a navigation database, a cost data file, a cost data table, a cost data matrix or any other suitable format for storing cost data. The cost data set may be stored separately from the associated navigation data set or the cost data set may also be part of the navigation data set, with which the cost data set is associated, for instance.

A navigation data set may comprise map data representing a map of a specific geographic region on earth. For example, the map data represents a two- or three-dimensional map of the specific geographic region on earth and/or a transportation (e.g. road, trail and/or rail) map of the specific geographic region on earth.

The navigation data of a navigation data set may for example define or comprise routing nodes and routing links between corresponding routing nodes. The routing nodes and routing links may represent (at least a part of) a routing or transportation (e.g. a road, trail and/or rail) network of the corresponding geographic region.

Map data of a navigation data set may be further partitioned into tile data sets, wherein each tile data set may represent a map of the intersection of a predetermined tile with the specific geographic region. For example, a geographical area such as the surface of the earth may be sub-divided into predetermined tiles. The tiles are for example tiles of a regular or irregular grid and/or a geographic grid. Each tile may be associated with a tile identifier (e.g. a unique tile identifier). The tiles may be seen as logical tiles (regularly) partitioning a map of a geographic region. A tile data set generally covers a smaller geographic region compared to a navigation data set, which may represent a map of a geographic region extending over multiple tiles. As a border of a map of a tile data set generally does not coincide with a border of a map of a navigation data set, a tile data set may also be only partially filled with navigation data of a navigation data set.

The map represented by a navigation data set may be an independent map, for example a map independent of maps represented by other navigation data sets of the navigation data source such that a navigation data set of the navigation data source may be updatable independently from other or further navigation data sets of the navigation data source. Accordingly, the geographic region a map of which is represented by a navigation data set may also be referred to as update region.

A navigation data set may further comprise gateway data defining one or more gateways. For example, the gateway data may comprise a gateway table (e.g. a regional gateway table), wherein each entry of the gateway table at least partially defines one gateway.

A gateway may be defined by position information specifying the position associated with the gateway. The position associated with a gateway may be understood to be a geographic position. A geographic position may for example be defined by a tile identifier of the tile in which the position associated with the gateway is located and/or geographic coordinates such as a specific pairing of latitude and longitude in a Cartesian coordinate grid, a Spherical coordinate system, an ellipsoid-based system such as the World Geodetic System (WGS) or by coordinates of a global navigation satellite system (GNSS). Accordingly, the definition of a gateway (e.g. an entry in a gateway table) for example comprises geographic coordinates of the position associated with the gateway. Alternatively or additionally, a definition of a gateway (e.g. an entry in a gateway table) may comprise a tile identifier of the tile in which the position associated with the gateway is located and/or a gateway identifier (e.g. a unique gateway identifier).

A gateway may be understood to be associable with another gateway (e.g. the gateway defined by the further navigation data set) if both gateways are associated with the same position (e.g. the same geographic position and/or the same tile). For example, a navigation data set may be linkable to a further navigation data set by use of a gateway defined by the navigation data set which is associable with a gateway of the further navigation data set. A gateway may be associated with another gateway if the other gateway is identifiable as associated gateway. For example, the other gateway may be identified as associated gateway in a definition of the gateway (e.g. an entry in a gateway table). Alternatively or additionally, gateways may be identifiable as associated gateways by corresponding definitions of the gateways and/or corresponding entries in a gateway table, for example gateways may be identifiable as associated gateways if definitions of both gateways and/or entries for both gateways in a gateway table comprise the same gateway identifier and/or the same position information like a tile identifier and/or geographic coordinates.

As described above, associated gateways may form a link between two different navigation data sets representing two different maps (in particular two independent maps) e.g. of at least partially adjacent geographic regions. For example, associated gateways may form a routing link between a routing network of a map of a geographic region represented by a navigation data set and a routing network of a map of an at least partially adjacent geographic region represented by a further navigation data set.

A gateway may also be associable with more than one other gateway. For instance, there may be more than one navigation data set representing a map of the same region or a (partially) overlapping region. Thus, for example, a gateway defined by a navigation data set may be linked to two gateways defined by two further navigation data sets. This may be advantageous as different navigation data sets may represent maps with different levels of detail.

For instance, the navigation data set may be linkable to a respective further navigation data set by a gateway which is associable with a further gateway defined by the further navigation data set. The gateway is associated with a position at the geographic region and the position associated with the gateway may be located on a border of the geographic position. The gateway associable with a further gateway may thus define a potential routing link from a position of the geographic region to a position associated with the gateway defined by the further navigation data set. This has for example the effect that the navigation data set is linkable to the further navigation data set representing a map of an adjacent region. Accordingly, the gateway may serve for linking the navigation data set to a further navigation data set representing a map of an adjacent geographic region.

The routing link between associated gateways may be formed between the positions associated with these associated gateways. When a route is determined at least partially based on one of the navigation data sets defining one of the associated gateways and the route arrives at a position associated with the gateway defined by this navigation data set, the route may for example be continued at a position associated with the associated gateway defined by the further navigation data set and determining the route may be continued at least partially based on this further navigation data set. Thus, the navigation data set based on which a route is determined may be switched at a position associated with associated gateways. Navigation data sets representing maps of different geographic regions may accordingly be used for determining different portions of a route. This may also be advantageous, as it may be switched between different navigation data sets, for example different navigation data sets representing maps having different level of details or being optimized for different computing requirements.

A plurality of gateways is understood to mean that the navigation data set defines at least two, preferably at least three gateways. However, a respective navigation data set may even define hundreds of gateways. Generally, it is possible that a respective navigation data set also defines further gateways (or further pluralities of gateways) in addition to the plurality of gateways.

By the plurality of gateways, the navigation data set may be linked to only one further navigation data set. However, usually, while some gateways may link a navigation data set with only one further navigation data set, the plurality of gateways usually link the navigation data set to multiple further navigation data sets.

A gateway pair is in particular understood to be a pair of two (different) gateways of the plurality of gateways defined by the navigation data set. For instance, if the navigation data set defines a first gateway G1, a second gateway G2 and a third gateway G3, the possible gateway pairs are (G1, G2), (G1, G3), (G2, G1), (G2, G3), (G3, G1) and (G3, G2), e.g. with one (e.g. the first) gateway indicating the "from gateway" and the other (e.g. the second) gateway indicating the "to gateway". Thus the gateway pair (G1, G2) may be considered different from the gateway pair (G2, G1).

For each of at least a part of such possible gateway pairs, the cost data set comprises costs data defining a cost value. In other words, the cost data indicates at least one cost value each for at least a part of possible gateways pairs from said plurality of gateways of said navigation data set. A cost value may be defined by providing cost data explicitly storing or saving a cost value. For instance, in case the cost data is provided as a cost table, a cost value may be provided as a corresponding entry in that table. However, the cost value may also be derivable, e.g. by further computations, from the cost data. For example, the cost data may also provide a function and a cost value may then be defined by the cost data by deriving the cost value from the cost data by means of the function. While a cost value may only be provided for at least a part of the possible gateway pairs, it is advantageous when the cost data defines a cost value for each of all possible gateway pairs defined by a respective navigation data set.

The cost value indicates a cost for a route between gateways of a respective gateway pair. A route may represent a possible path in the geographic region the map of which is represented by the respective navigation data set. A route may be defined by a specific combination of routing nodes and/or routing links of the navigation data of the navigation data set, for example. The route may in particular only lie within the geographic region the map of which is represented by the respective navigation data set which defines the respective gateways.

The cost value for indicating a cost may for instance be a number. However, the format of the cost value may depend on the type of cost the cost value is indicating.

The cost indicated by the cost value may for instance be a length cost of the corresponding route or a time cost needed to traverse a corresponding route between the gateways of the gateway pair, to name two examples.

A cost may be understood as a measure with respect to a certain property of a specific route. It may be desirable to have a cost as low or as high as possible for a certain route. For instance, in case of a length cost or a time cost, it may be desirable to have a cost as low as possible for a certain route. Nevertheless, it may also be desirable for a certain cost type (e.g. a scenic cost, wherein a higher value indicates a more scenic route) to have a cost as high as possible.

Generally, there may be more than one possible route between a specific gateway pair. The cost data may thus define different cost values for different routes between the same gateway pair. Preferably, however, for a specific cost type, only one cost value is provided for specific gateway pair. For example, the cost value may indicate the costs for the route with the lowest costs for a specific cost type.

The navigation data source may comprise more than one cost data set. For instance, the navigation data source may comprise a plurality of cost data sets each associated with a respective navigation data set of a plurality of navigation data sets. Each cost data set and/or each (further) navigation data set may have the described features according to the first aspect of the invention and/or exemplary embodiments thereof.

A cost data set according to the first aspect of the invention may facilitate determining a route. In particular, determining a route may be facilitated because certain points (e.g. gateways) of the route may be determined only based on the cost data set without the need of accessing further navigation data from the navigation data set. In particular, it may be determined, which navigation data sets should be used for a to be determined route without the need of accessing further data from the navigation data set.

In the following, the features of exemplary embodiments according to the first aspect of the invention are described by way of examples.

According to an exemplary embodiment of the first aspect of the invention, at least a part of the gateways of the plurality of gateways is associated with a position at a border of the geographic region a map of which is represented by the navigation data set.

Preferably all gateways of the plurality of gateways are associated with a position at a border of the respective geographic region. The navigation data set may also define further pluralities of gateways. Nevertheless, it is possible, that the navigation data set may only define gateways associated with a position at a border of the respective geographic region. The border is for instance an outer border of the respective geographic region. This may be understood to mean, that the position associated with respective gateway is not spaced apart from the border of the geographic region. However it is generally possible, that one or more gateways associated with a respective position are located within the geographic region and spaced from a border of the geographic region, i.e. the respective gateway is not located on a border of the geographic region.

According to an exemplary embodiment of the first aspect of the invention, the geographic region (a map of which is represented by the navigation data set) and the further geographic region (a map of which is represented by the further navigation data set) are at least partially adjacent regions. Adjacent geographic regions may be defined as geographic regions having at least in part a common border. Two adjacent geographic regions may in particular have no overlap or may partially overlap at their respective borders.

Accordingly, in one example, the navigation data set may be linkable to a further navigation data set by a gateway which is associable with a further gateway defined by the further navigation data set. Thus, a routing link may be formed between the navigation data set and the further navigation data set representing maps of at least partially adjacent geographic regions by associating these gateways and enabling computing a continuous route via the routing link in a corresponding larger geographic area.

According to an exemplary embodiment of the first aspect of the invention, the navigation data source comprises a plurality of cost data sets each associated with a respective navigation data set.

For example, the navigation data source may comprise two, three, four, five or even more cost data set. Generally, the number of cost data sets may correspond (i.e. be equal) to the number of navigation data sets of the navigation source. Any cost data set may have the features described according to the first aspect of the invention or embodiments thereof. Accordingly, any navigation data set which the cost data set is associated to, may have the have the features described according to the first aspect of the invention or embodiments thereof.

According to an exemplary embodiment of the first aspect of the invention, the cost data set further comprises: gateway key data indicating one or both gateways of a respective gateway pair for a respective cost value, and/or gateway position data representing a position associated with a respective gateway defined by a respective navigation data set.

Gateway key data may for example indicate both gateways of a gateway pair for a respective cost value. For instance, for a cost value c1 for a route from a gateway G1 to a gateway G2, the cost data may define (e.g. comprise) an entry (G1, G2, c1) with the gateway key data being (G1, G2). However, in case of a specific ordering of the cost data, for example, it may also be possible that the gateway key data only indicates one of the gateways of the gateway pair or that the gateway key data is omitted. The respective first and/or second gateway for a specific cost value could then be derived from the position of the entry of the cost value in the cost data, for instance. Preferably, all cost values for a route from or to a certain gateway may be stored in a single entity, e.g. in a binary large object (BLOB). Alternatively or additionally, a gateway key data set could be provided indicating for every cost value defined by the cost data one or both of the gateways of a gateway pair.

A position associated with a respective gateway may for instance be a geographic position. Such position data may for instance represent a position at the respective geographic region a map of which is represented by a respective navigation data set. The gateway position data may represent a position associated with a respective gateway for at least a part (preferably all) gateways of the plurality of gateways defined by the respective navigation data set. For instance, the gateway position data may comprise geographic coordinates such as a specific pairing of latitude and longitude in a Cartesian coordinate grid, a Spherical coordinate system, an ellipsoid-based system such as the World Geodetic System (WGS) or by coordinates of a global navigation satellite system (GLASS). Gateway position data may be useful for utilizing a more efficient routing algorithm.

According to an exemplary embodiment of the first aspect of the invention, cost values indicate a cost of one or more of the following types: a time cost for a respective route; a length cost for a respective route; a monetary cost for a respective route; a scenic cost for a respective route; a desirability cost for a respective route.

With regard to a time cost, the cost value may be a (minimum, maximum or average) time needed to traverse a corresponding route between the gateways of the gateway pair. The cost value may be or comprise a measure for the travel time in seconds, minutes and/or hours or any other suitable time unit. For instance, an exemplary cost value for a time cost may be "1 h 52 m 23 s".

With regard to a length cost, the cost value may be a (minimum, maximum or average) length of a corresponding route between the gateways of the gateway pair. The cost value may be or comprise a measure for a length of the route in meters, kilometers and/or miles or any other suitable distance units. For instance, an exemplary cost value for a length cost of a route between gateways of a gateway pair may be "167.45 km".

With regard to a monetary cost, the cost value may be a (minimum, maximum or average) monetary cost to be spent for traversing a corresponding route between the gateways of the gateway pair. The cost value may be or comprise a measure for a monetary cost for traversing the route with respect to a certain currency, for example. A monetary cost may take the monetary costs for fuel and/or road tolls into account. For instance, an exemplary cost value for a monetary cost of a route between gateways of a gateway pair may be "25.45 €".

With regard to a scenic cost, the cost value may be a (minimum, maximum or average) measure for a scenic value for a traveler traversing the route. For instance, a freeway may have a lower scenic cost than a country road. A scenic coast value may be or comprise a number indicating the degree of scenic value. For instance, an exemplary cost value for a scenic cost of a route between gateways of a gateway pair may be "672".

With regard to a desirability cost, the cost value may be a measure for the desirability of a traveler for traveling a route. For instance, the desirability cost may indicate whether the route comprises certain kinds of roads. For instance, in case a desirability cost of a route does not match with, is lower than or higher than a provided desirability of the traveler, a route may be considered or discarded for a to be determined route.

According to an exemplary embodiment of the first aspect of the invention, the cost data defines for at least a part of the gateway pairs multiple cost values each, each cost value of the multiple cost values indicating a cost of a different type.

As an example, the cost data may define, for a gateway pair, at least two, three, four, five or more cost values. As an example, the cost data may define a time cost, a length cost and scenic cost for a specific gateway pair. The different cost values for a gateway pair may indicate the costs for the same route or for (at least in part) different routes between the respective gateways of the gateway pair. Preferably, the cost data defines for all gateway pairs in each case the same types of cost values.

According to an exemplary embodiment of the first aspect of the invention, the cost data comprises respective cost values. For instance, the cost data set, e.g. a cost table or a cost matrix, may comprise items or entries with the respective cost values.

According to an exemplary embodiment of the first aspect of the invention, the cost data comprises a cost value for each possible gateway pair of the plurality of gateways and for each provided cost type. The cost data may thus comprise separate cost values for each possible gateway pair and for each provided cost type. For a specific gateway pair and for a specific cost type, the cost data can thus provide easily accessible corresponding cost values.

According to an exemplary embodiment of the first aspect of the invention, the cost data of the cost data set associated with the navigation data set is independent of information from other (e.g. all other) navigation data sets.

Preferably not only the cost data, but also the cost data set is independent of information from other navigation data sets. Thus, the cost data or the cost data set can be computed independently from other navigation data sets the cost data set is not to be associated with. This facilitates updating of navigation data sets, as the cost data or the cost data set associated with the navigation data set is not influenced by updating of another navigation data set and/or of another associated cost data set.

According to an exemplary embodiment of the first aspect of the invention, the cost data of the cost data set associated with the navigation data set is only based on information from the navigation data set.

Preferably not only the cost data, but also the cost data set is only based on information from said navigation data set. Thus, the cost data or the cost data set can be computed only based on the navigation data set the cost data set is to be associated with. This further facilitates updating of navigation data sets, as the cost data or the cost data set associated with the navigation data set is not influenced by updating or changing of other data of the navigation data source.

According to an exemplary embodiment of the first aspect of the invention, the navigation data set further comprises: a plurality of routing nodes, and node cost data, the node cost data defining for at least a part of possible combination of a respective routing node and a gateway defined by the navigation data set a cost value each, the cost value indicating a cost for a route between the respective routing node and the respective gateway.

For instance, node cost data is provided for each of at least a part of the routing nodes of the plurality of routing nodes. The navigation data set may also comprise further pluralities of routing nodes. However, preferably, all of the routing nodes of a navigation data set are provided by said plurality of routing nodes. It is preferred that for every (non-bivalent) routing node of a given navigation a node cost data is provided.

For instance, in case the navigation data set comprises routing nodes N1 and N2 and gateways G1 and G2, the node cost data defines for each possible combination or pair of a respective routing node and a gateway, that is for (N1, G1), (N1, G2), (N2, G1), (N2, G2), (G1, Ni), (G1, N2), (G2, N1), (G2, N2), a cost value. Generally, the node cost data may be similar to the cost data, but referring to a pair of routing node and gateway instead of two gateways. Thus, with respect to exemplary embodiments for cost values of the node cost data it is referred to possible cost values defined by the cost data of the cost data set.

According to an exemplary embodiment of the first aspect of the invention, the navigation data source further comprises: at least one navigation data set and/or at least one further navigation data set.

One or more of the at least one navigation data set may be a navigation data set according to the first aspect. For instance, all of a plurality of navigation data sets may be a navigation data set according to the first aspect. Likewise, one or more of the at least one further navigation data set may be a navigation data set according to the first aspect. For instance, all of a plurality of further navigation data sets may be a navigation data set according to the first aspect.

According to an exemplary embodiment of the first aspect of the invention, the navigation data source comprises multiple navigation data sets representing maps with different levels of detail, wherein a cost data set ( ) is only associated with a respective navigation data set in case a level of detail of a map represented by the respective navigation data set is sufficiently low.

The level of detail of a map may be understood to be lower than the level of detail of another map if the map contains fewer details than the other map (i.e. the other map contains additional details such as additional roads, additional points of interest, etc.). For example, the map represented by the navigation data set is thinned out compared to a fully-fledged map.

For instance, a cost data set is only associated with a navigation data set in case it represents a thinned out map.

For example, a map with lower detail may contain a certain selection of roads comprising only main roads such as motorways, highways, expressways, major roads, etc. A map with higher detail may additionally contain side roads (e.g. residential roads). For example, a map with a higher level of detail may contain each road of a map of a lower detail and one or more additional roads.

Alternatively or additionally, the level of detail of a map may be understood to be lower than the level of detail of another map if the map has a larger scale (e.g. a larger map scale) and/or a lower accuracy (e.g. the navigation data set representing the map has a lower data accuracy) and/or a lower resolution (e.g. the navigation data set representing the map has a lower data resolution) and/or a lower density (e.g. the navigation data set representing the map has a lower data density) than the other map. A map scale may describe the ratio of a distance on the map to the corresponding distance on the ground. A data accuracy of a navigation data set representing a map may describe the variance of a position of an object on the map and the actual geographic position of the object. A data resolution of a navigation data set representing a map may describe the smallest difference between adjacent geographic positions that are recorded and/or recordable in the navigation data set. A data density of a navigation data set representing a map may describe the ratio of the amount of data contained in the navigation data set per unit area of the specific geographic region a map of which is represented by the navigation data set.

According an exemplary aspect of the invention, a method, performed by at least one apparatus, is presented, the method comprising: creating at least one cost data set associated with a navigation data set for a navigation data source according to the first aspect of the invention.

For instance, the method may be performed by a system vendor, a compilation company, or an end user. Preferably, a cost data set for a navigation data set is created independently of information from other navigation data sets.

According to an exemplary embodiment according to the first aspect, the method further comprises: checking a validity of a navigation data set by comparing the created cost data set or a part thereof associated with the navigation data set with a cost data set or a part thereof associated with a previous version of the navigation data set.

Since the cost data set can be regarded as containing information about the navigation data set or the respective represented map, a comparison may allow detection of errors or of suspicious or unwanted changes in the navigation data set. For instance, the cost data or a part thereof (e.g. single cost values) may be compared to the previous cost data or a part thereof (e.g. previous single cost values). In case a difference between the cost data and the previous cost data in total or for each single cost value individually is below or not above a predefined threshold (e.g. 5%), a navigation data set may be considered valid. Otherwise the navigation data set may be considered as invalid.

Thus, the method may also comprise determining that the navigation data set is valid if a difference between the created cost data set or a part thereof associated with the navigation data set and the cost data set or a part thereof associated with the previous version of the navigation data set is less than or not above a predefined threshold. Likewise, the method may also comprise determining that the navigation data set is invalid if a difference between the created cost data set or a part thereof associated with the navigation data set and the cost data set or a part thereof associated with the previous version of the navigation data set is above or not less than a predefined threshold.

According to an exemplary embodiment of the first aspect of the invention, the method further comprises providing the navigation data source according to the first aspect of the invention. For example, the navigation data source may be provided by a server to a navigation device. Providing the navigation data source to the navigation device may for example be understood to mean that the navigation data source is sent or triggered to be sent to the navigation device. For example, the navigation data source is sent or triggered to be sent by the server in a signal or as part of a signal (e.g. a network and/or radio signal). The navigation data source may for example be sent by transmitting the navigation data source in such a signal or as part of such a signal by transmitting means of the server, for example a communication interface such as a network interface and/or radio interface (e.g. a transmitter and/or a transceiver). In certain exemplary embodiments of the first exemplary aspect of the invention, the signal may be a cellular radio signal or a Bluetooth radio signal or a wireless local area network (WLAN) signal. Alternatively or additionally, providing the navigation data source to the navigation device may for example be understood to mean that the navigation data source is made accessible to and/or retrievably by the navigation device, for example accessibly and/or retrievably stored in memory means (e.g. a storage medium) of the server.

According to an exemplary embodiment of the first aspect of the invention, a computer program code is presented, the computer program code when executed by a processor causing an apparatus to perform the actions of the method of the first aspect of the invention.

According to an exemplary embodiment of the first aspect of the invention, a storage medium is presented, which comprises the navigation data source according to the first aspect of the invention. The storage medium may be a tangible storage medium, for example a tangible computer-readable storage medium. The storage medium may be a storage medium of a navigation device and/or for a navigation device, for example a navigation device according to the second aspect of the invention.

According to an exemplary embodiment of the first aspect of the invention, a server is presented, which comprises means for performing the method according to the first aspect of the invention. The means of the server may be implemented in hardware and/or software. They may comprise for instance at least one processor for executing computer program code for realizing the required functions, at least one memory storing the program code, or both. Alternatively, they could comprise for instance circuitry that is designed to realize the required functions, for instance implemented in a chipset or a chip, like an integrated circuit. In general, the means may comprise for instance one or more processing means such as a processor and a memory. Optionally, the server may comprise various other components, like a communication interface, a network interface, a radio interface, a data interface, a user interface etc.

For example, the server comprises at least one processor and at least one memory including computer program code, the at least one memory and the computer program code configured to, with the at least one processor, cause an apparatus at least to perform at least partially the method and/or the steps of the method according to the first aspect of the invention.

The server may be a server of a system according to the third aspect of the invention.

According to a second aspect of the invention, a method, performed by at least one apparatus, is presented, the method comprising: obtaining and/or storing a navigation data source according to the first aspect of the invention; obtaining a routing request for computing a route, wherein the routing request at least defines a starting position and a destination position for the route; determining or triggering determining the route at least partially based on the routing request and the navigation data source, wherein the route crosses at least one geographic region from one gateway to another gateway defined by a navigation data set of the navigation data source, providing the determined route.

Obtaining the navigation data source may be understood to mean that the navigation data source is received in a signal or as part of a signal (e.g. a network and/or radio signal). The navigation data source may for example be received in such a signal or as part of such a signal by receiving means of the navigation device, for example a communication interface such as a network interface and/or radio interface (e.g. a receiver and/or a transceiver). In certain exemplary embodiments of the second aspect of the invention, the signal may be a cellular radio signal or a Bluetooth radio signal or a wireless local area network (WLAN) signal. Alternatively or additionally, receiving the navigation data source may for example be understood to mean that the navigation data source is made accessible to and/or retrievable by the navigation device, for example by receiving a storage medium comprising the navigation data source in storage medium reading means of the navigation device (e.g. a storage medium interface such as a storage medium drive or a storage medium connector).

Storing the navigation data source may for example be understood to mean that the navigation data source is stored in memory means (e.g. a storage medium) of the navigation device.

A routing request may be obtained by receiving user input on the navigation device. For example, the routing request is received by user input means of the navigation device (e.g. a user interface such as a touch sensitive display, a key, a keyboard or a touchpad). Alternatively or additionally, the routing request may be received in a signal or as part of a signal (e.g. a network and/or radio signal), for example by receiving means of the navigation device such as a communication interface as described above. For example, the routing request may comprise an address and/or geographic coordinates as starting position and/or as destination position.

Causing determining the route may be understood to mean that a request for determining the route is transmitted to a server (e.g. the server of the first and/or third aspects of the invention) such that the server is caused to determine (e.g. compute) the route at least partially based on the routing request and the navigation data source. Subsequently, the determined route may be received at the navigation device from the server.

Determining the route at least partially based on the routing request and the navigation data source may be understood to mean that a route from the starting position to the destination position is determined (e.g. computed) at least partially based on the navigation data and in particular the cost data comprised in the navigation data source. For example, the route may be determined by the navigation device. Alternatively, the route may be computed by the server as described above.

Preferably, the route crosses multiple (e.g. two, three or more) geographic regions each from one gateway to another gateway, said gateways defined by respective navigation data sets of the navigation data source.

Providing the computed route may for example be understood to mean that the computed route is provided for displaying and/or for navigating along the computed route. For example, the route may be provided by causing display of the route or of a portion of the route (e.g. on displaying means of the navigation device such as a user interface) and/or by causing navigating along the computed route.

According to an exemplary embodiment of the second aspect of the invention, the method further comprises: obtaining at least one cost preference. A cost preference may be obtained for one or more cost types. For instance, a cost preference may indicate that the shortest route, the fastest route or the most scenic route is desired. Determining the route is then additionally based on the obtained cost preference. The cost preference may be obtained as described in connection with the routing request, e.g. by receiving user input on the navigation device.

According to an exemplary embodiment of the second aspect of the invention, determining the route comprises: determining at least one gateway to be on the route and defined by a navigation data set representing a map of a geographic region to be crossed from gateway to gateway by the route at least partially based on a respective cost data set associated with said navigation data set.

Preferably, the at least one gateway is determined only based on the respective cost data set associated with the navigation data set, so that no further navigation data (e.g. routing nodes or routing links) of the respective navigation data set needs to be accessed. In case the navigation data set also comprises gateway position data, the determining of at least one gateway to be on the route, may also be based on said gateway position data.

According to an exemplary embodiment of the second aspect of the invention, determining the route comprises: determining, for every navigation data set representing a map of a geographic region to be crossed from gateway to gateway by the route, at least one gateway to be on said route and defined by a respective navigation data set at least partially based on a respective cost data set associated with a respective navigation data set.

Preferably, the at least one gateway is in each case determined only based on the respective cost data set associated with the navigation data set, so that no further navigation data (e.g. routing nodes or routing links) of the respective navigation data set needs to be accessed.

According to an exemplary embodiment of the second aspect of the invention, a starting navigation data set represents a map of a geographic region comprising the starting position; a destination navigation data set represents a map of a geographic region comprising the destination position; and determining the route comprises at least one of: determining a sub-route from the starting position to a gateway defined by the starting navigation data set; determining a sub-route from a gateway of the destination navigation data set to the destination position; determining a sub-route between a gateway pair defined by a navigation data set representing a map of a geographic region to be crossed from gateway to gateway by the route.

According to an exemplary embodiment of the second aspect of the invention, one or more of the sub-routes is determined at least partially based on node cost data of a respective navigation data set.

According to an exemplary embodiment of the second aspect of the invention, a computer program code is presented, the computer program code when executed by a processor causing an apparatus to perform the actions of the method of the second aspect of the invention.

According to an exemplary embodiment of the second aspect of the invention, a navigation device is presented, which comprises means for performing the method according to the second aspect of the invention. The means of the navigation device may be implemented in hardware and/or software. They may comprise for instance at least one processor for executing computer program code for realizing the required functions, at least one memory storing the program code, or both. Alternatively, they could comprise for instance circuitry that is designed to realize the required functions, for instance implemented in a chipset or a chip, like an integrated circuit. In general, the means may comprise for instance one or more processing means such as a processor and a memory. Optionally, the navigation device may comprise various other components, like a communication interface, a network interface, a radio interface, a data interface, a user interface etc.

For example, the navigation device comprises at least one processor and at least one memory including computer program code, the at least one memory and the computer program code configured to, with the at least one processor, cause the navigation device to at least perform at least partially the method and/or the steps of the method according to the second aspect of the invention.

The navigation device is for example a GNSS-enabled smartphone and/or a navigation device of a vehicle (e.g. an automotive navigation device and/or a car navigation device).

According to a third aspect of the invention, a navigation system is presented, which comprises:
    a navigation device according to the second aspect of the invention; and
    a server according to the first aspect of the invention.

For example, the navigation system is a hybrid navigation system in which one or more navigation data sets are cached and/or permanently stored on the navigation device and one or more navigation data sets are received at the navigation device from the server if required for computing a route and/or for navigating along a computed route and/or for displaying a computed route.

For instance, as described above, respective gateways to be on the route can be determined at least partially based on respective cost data sets. Thus, it can be determined which navigation data sets are needed for routing and only those navigation data sets representing a map of a geographic region to be crossed and/or touched by the route need to be obtained or updated.

If a communication connection to the server is available, the navigation device for example transmits a request for the one or more navigation data sets needed. For example, each of the requested navigation data sets represents a map of a geographic region touched and/or crossed by the route. In response to this request, the server may transmit the requested navigation data set(s) to the navigation device. Subsequently the navigation device may finish compute the route.

The features and example embodiments of the invention described above may equally pertain to the different aspects according to the present invention.

It is to be understood that the presentation of embodiments of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

FIG. 1 is a block diagram of an exemplary embodiment of a navigation data source 100 according to the first aspect of the invention. In FIG. 1, the navigation data source 100 is depicted as navigation database. The navigation data source 100 may be a relational database (e.g. a SQL database) comprising (e.g. storing) one or more navigation data sets 101, 102, 103, 104 etc. For example, the navigation data source 100 is a NDS navigation database (i.e. a navigation database according to the NDS standard or at least partially compatible with the NDS standard). Each navigation data set 101-104 of the navigation data source 100 may comprise navigation data (such as map data, routing nodes and/or routing links) representing a map of a specific geographic region and gateway data defining one or more gateways. The navigation data sets 101-104 of the navigation data source 100 may be updatable independently from each other.

The navigation data source further comprises cost data sets CT101, CT102, CT103, CT104 etc. in the form of cost tables associated with respective navigation data sets 101-104. The cost data sets may however also be part of the respective navigation data sets. Each cost data set CT101-CT104 comprises respective cost data CD101-CD104.

Figure 5A:
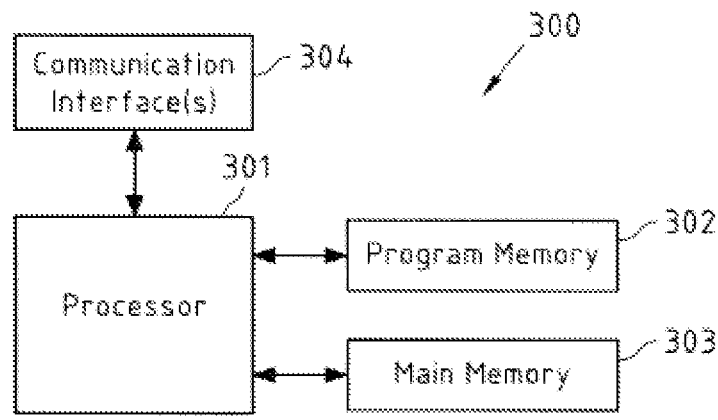
FIG. 5a is a block diagram of an exemplary embodiment of a server according to the first aspect of the invention.
Figure 5B:
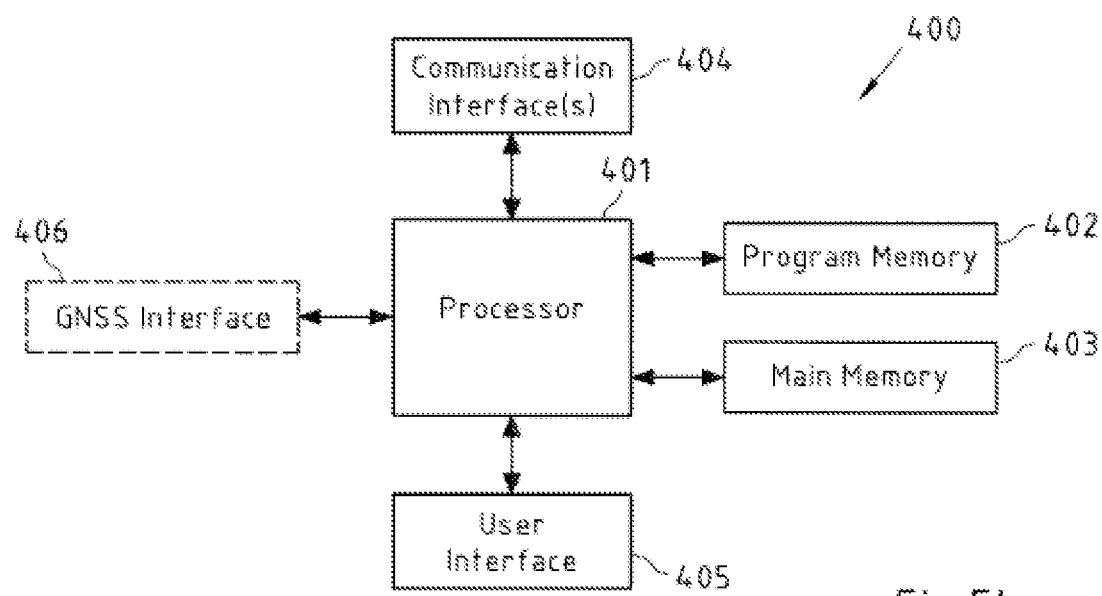
FIG. 5b is a block diagram of an exemplary embodiment of a navigation device according to the second aspect of the invention.

The navigation data source 100 may be stored on a storage medium (see FIG. 7) and/or in program memory 402 of navigation device 400 (see FIG. 5b).

Figure 1A:
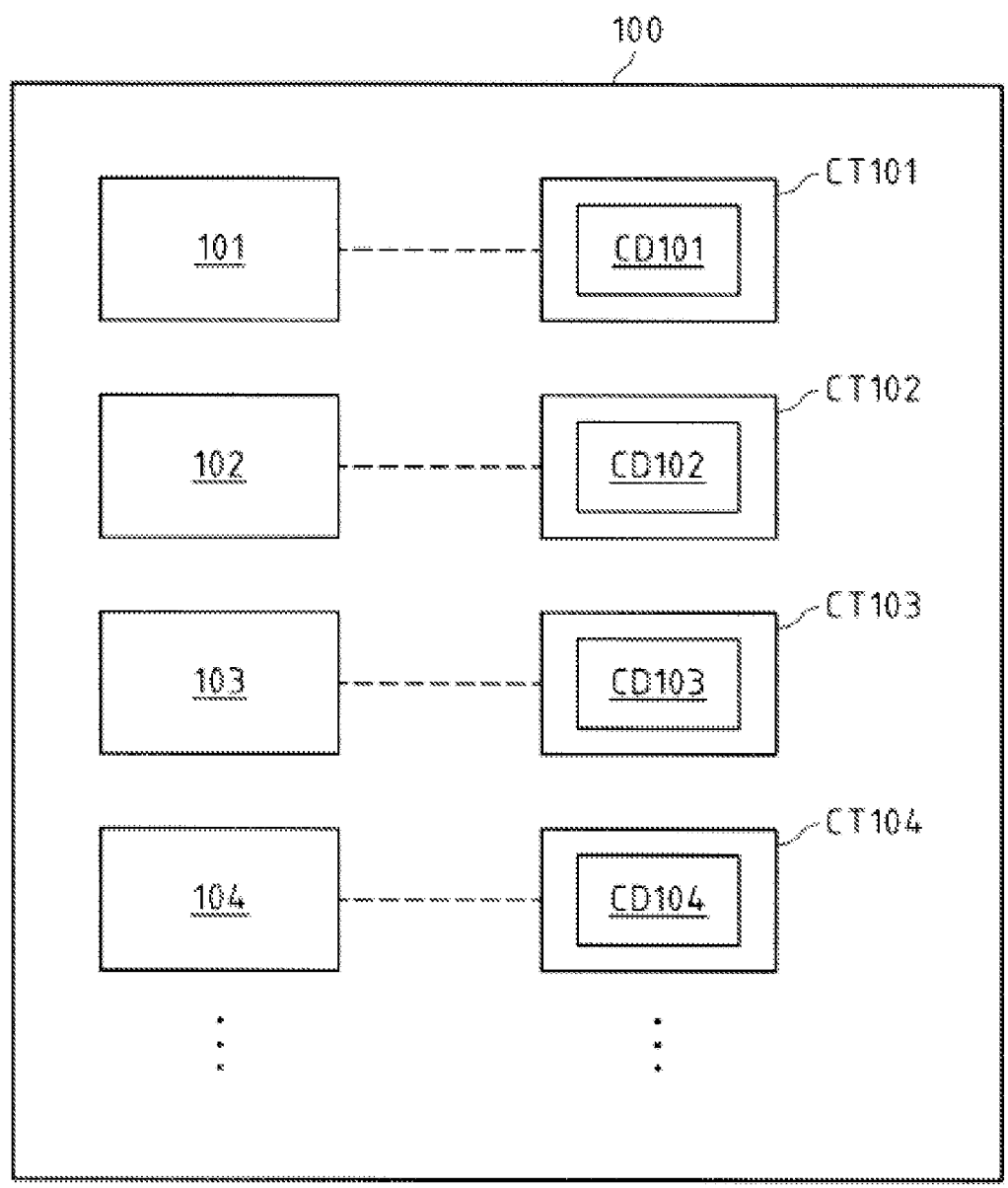
FIG. 1a is a block diagram of an exemplary embodiment of a navigation data source according to the first aspect of the invention.
Figures 1B, 1C:
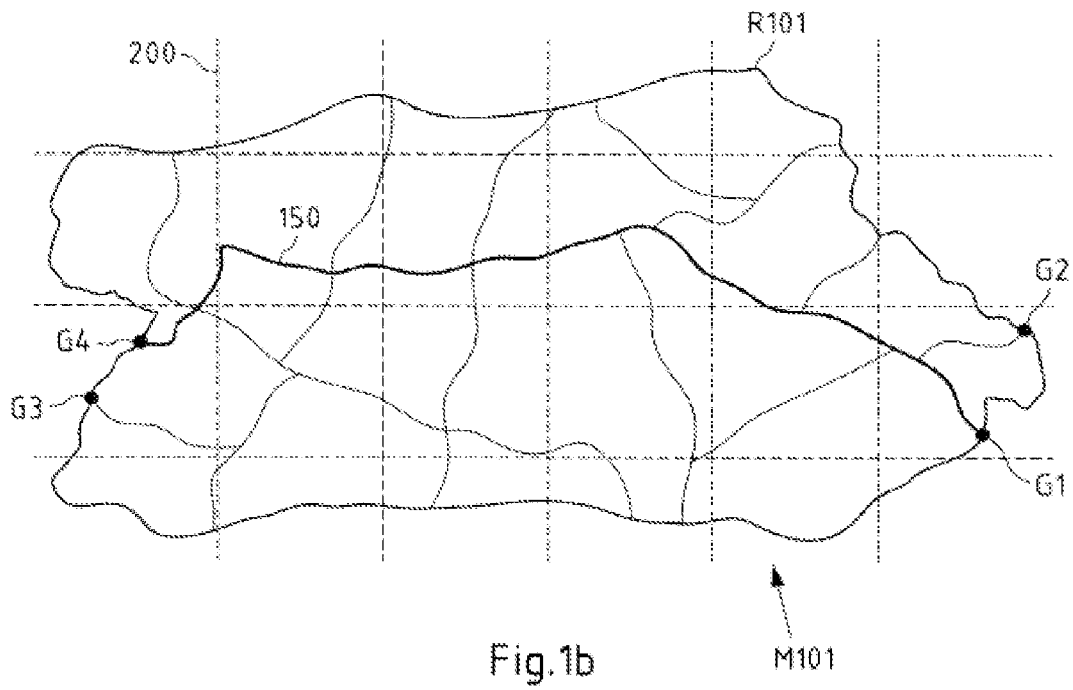
FIG. 1b shows an exemplary map of a geographic region, represented by a navigation data set of a navigation source.
FIG. 1c shows an exemplary embodiment of a cost data set.

FIG. 1b shows an exemplary map of a geographic region, represented by a navigation data set of a navigation source, such as navigation data source 100 according to FIG. 1a. Map M101 of geographic region R101 is an example of a map which may be represented by navigation data set 101. In this example, the navigation data set 101 further defines gateways G1, G2, G3, G4 as shown in FIG. 1b.

Map M101 (and also the maps described in the following) is depicted as a road map. However, other types of maps, for example trail maps and/or three-dimensional maps are also possible.

The gateways G1-G4 (and also the gateways described in the following) are positioned at a border of the geographic region. The gateways may be defined by specifying the position at the geographic region R101 associated with respective gateway.

FIG. 1b also illustrates an exemplary route 150 from gateway G1 to gateway G4.

Furthermore, FIG. 1b shows a grid 200 sub-dividing the geographic area covered by map M101 into predetermined tiles. For example, grid 200 logically sub-divides the surface of the earth into predetermined tiles. Each tile of grid 200 may be associated with a respective tile identifier. The tiles (or the corresponding tile identifiers) may be used for accessing navigation data and/or for referencing navigation data. For this purpose, the navigation data of the navigation data sets of navigation data source 100 (e.g. navigation data sets 101, 102,103, 104) may be partitioned into tile data sets, wherein each tile data set represents the intersection of a predetermined tile of grid 200 with the map represented by the respective navigation data sets.

As can be seen, due to the regular tiling scheme, it is likely that the borders of a map represented by a navigation data set do not coincide with borders of a tile. A tile may therefore only be partially filled with content belonging to the corresponding navigation data set.

FIG. 1c shows an exemplary embodiment of a cost data set. The illustrated cost data set is a cost table and an example of cost data set CT101 of the navigation data source 100 of FIG. 1a. The cost data set of FIG. 1c may also be exemplary for the other cost data sets CT102, CT103, CT104 etc. of FIG. 1a.

The cost data set CT101 comprises cost data CD101. The said cost data CD101 defines for all possible gateway pairs of the plurality of gateways G1, G2, G3, G4 multiple (in this case three) cost values each. For this, the cost data set CD101 also comprises gateway key data GD101 indicating for each possible gateway pair both gateways with a gateway identifier, that is the "from gateway" and the "to gateway" for respective cost values CV. Only a part of the data is explicitly shown in FIG. 1c, however.

Each cost value CV indicates a cost for a route between gateways of respective gateway pair indicated by the gateway key data GD101. Here, for each gateway pair the cost values CV each indicate a cost of a different type, namely a length cost for a route between respective gateways (Cost "Shortest"), a time cost for a route between respective gateways (Cost "Fastest") and a scenic cost for a route between respective gateways (Cost "Scenic"). The costs for different cost types for a specific gateway pair may pertain to the same route or to different routes between the respective gateways. As an example, the cost values given for gateway pair (G1, G4) in FIG. 1c may all pertain to the same route 150 shown in FIG. 1b.

Thus, each cost data set CT101, CT102, CT103, CT104 etc. contains for all possible gateway pairs defined by the respective associated navigation data set 101, 102, 103, 104 etc. and for all possible cost types (e.g. all cost types used by a navigation application) exactly one cost value CV. More generally, if a navigation data set has n gateways and m different cost types are used (e.g. by an application) then there are $n*(n-1)*m$ cost values. The cost values can for example be stored in a cost data set in the form of a cost table having the structure ("from gateway", "to gateway", cost_1, ..., cost_m) with a gateway key ("from gateway", "to gateway").

Such a cost data set may be created (e.g. computed) during compilation of a navigation data source or a navigation data set if at compilation time the cost types which are needed later on (e.g. used by the application) are known. A cost data set may be stored in or separate from the navigation data sets, e.g. in a separate SQLite file. However, if this is not the case, i.e. if the cost types are not known at the time of compilation, a cost data set can as another example also be created by a system vendor, i.e. by the navigation application and stored along with a corresponding navigation data set. A cost data set could also be created after a complete navigation data source or a part thereof (e.g. a navigation data set) has been installed on a device (e.g. a navigation device). A post-process running on the device could create a cost data set in case computation power is available, e.g. during those times when the device is idle. Thus, a compilation company could provide the navigation data source comprising single navigation data sets to various system vendors and each one of them could create a cost data set which fits to the cost types used by their navigation system. The original navigation data source does not have to be altered as the cost data sets can be stored in a separate file.

Assuming that a typical geographic region a map of which is represented by a navigation data set consists of one or several states of a country, the navigation data set might define up to 1000 gateways. This would mean that the cost data set would easily comprise up to 1 Million records. Such scales may be disadvantageous with respect to routing performance and storage space.

Thus, instead of the above approach suggesting a cost data set with the structure ("from gateway", "to gateway", cost_1, . . . , cost_m), a cost data set with the alternative structure ("from gateway", BLOB) is proposed. The gateways key data now only refers to a one gateway of a gateway pair. All cost data related to a specific "from gateway" (or "to gateway") is stored in a single binary large object (BLOB). The content of the BLOB might be expressed in datascript (which is a description language used by NDS), and describes in a binary encoded list the cost values for all "to gateways". Thus, one record of the BLOB consists of information ("to gateway", cost_1, . . . , cost_m). For around 1000 "to gateways", the size of each of those entries would be around 20 to 30 Byte which sums up to a BLOB size of around 20 to 30 Kbyte or even smaller.

According to another approach and to reduce the size even further, the gateway key data could be omitted completely and an inherent order of the data in the cost data set could be assumed or modeled in an external data set, e.g. of the structure (sequence number, gateway key data) consisting of entries like (1, 14123), (2, 23423), etc. In this case the entries of the cost data set would simply comprise records of the structure (cost_1, . . . , cost_m). In addition, the BLOB might be stored compressed.

As a result, the overall number of records for one cost data set would decrease from n*(n−1) entries in the cost data set to only n entries in a cost data set using a BLOB, n being the number of gateways defined by the respective navigation data set.

Another approach to address the above drawback with regard to performance or storage space would be a reduction of the number of gateways by only considering gateways of a part of navigation data sets. Typically a navigation data source, e.g. a (NDS) database, consists of navigation data sets representing maps with different levels of detail, so that different "routing layers" (e.g. 3 or 5 layers) may be established. For instance, a navigation data set representing a map with a low (e.g. the lowest) level of detail may define less than 10% of the gateways of a navigation data set representing a map with the highest level of detail. As a cost data set is primarily intended to be used for efficiently determining a route crossing a geographic region from gateway to gateway, it can be advantageous to consider only those gateways which are defined by navigation data sets representing a map with a sufficiently low level of detail (i.e. gateways of a sufficiently high layer). In addition, the cost values stored in the cost data set are then determined by using the navigation data sets representing a map with a sufficiently low level of detail only. The routing algorithm would then only use the available cost data sets (i.e. cost data sets associated with navigation data sets representing a map with a sufficiently low level of detail). Otherwise, the algorithm would continue using the normal navigation data of the navigation data sets.

The described cost data set can also beneficially be used for testing a validity of a navigation data source (or a part thereof). In order to be sure that the currently compiled routing network of a certain navigation data set is (probably) valid, the cost values stored in the cost data set are compared to the values stored in the cost data set of a former release. If these values are similar to each other, it is an indication that the routing network of the current compilation is valid. Values may be considered similar, for example if none of the newly determined cost values differs from the former value by more than an introduced threshold value (e.g. 5%). In other words, the information stored in a cost data set can be regarded as "aggregated information" of a navigation data set. By comparing this "aggregated information" of a certain version of the navigation data set to the "aggregated information" of a former version of a navigation data set, errors/suspicious situations can be detected.

Figure 2:
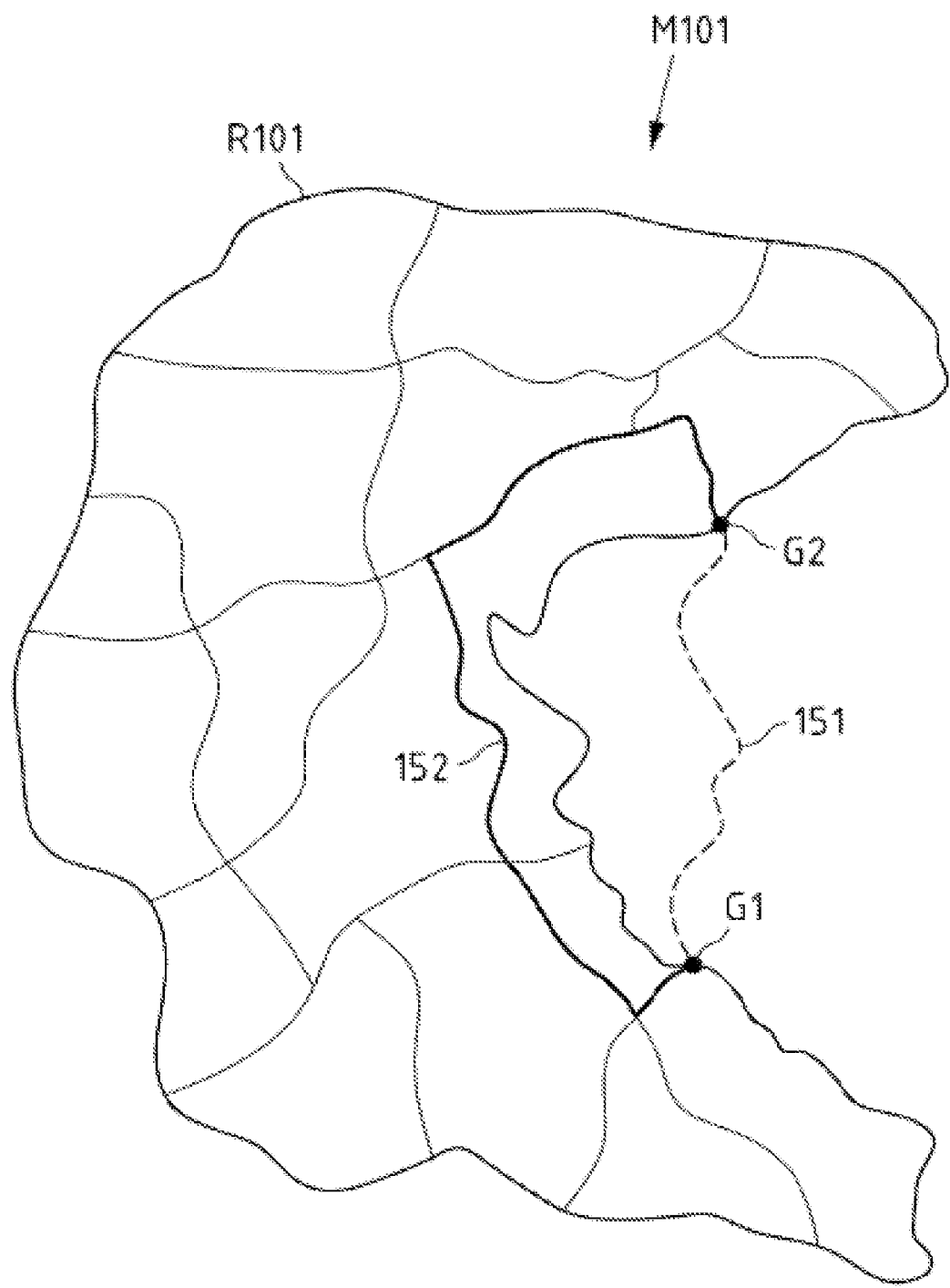
FIG. 2 is an illustration of the independency of cost data of a cost data set from other navigation data sets.

FIG. 2 is an illustration of the independency of cost data of a cost data set from other navigation data sets. FIG. 2 illustrates another example of map M101 of a geographic region R101 represented by navigation data set 101. The cost data CD101 and in particular the cost values CV, as described before with respect to FIG. 1, are only based on (e.g. computed based on) information from the navigation data set 101 to which the cost data set CT101 comprising the cost data CD101 is associated to. That means, that the cost data CD101 of a cost data set CT101 associated with a specific navigation data set 101 is independent from other navigation data sets (e.g. navigation data sets 102, 103, 104). Thus, while route 151 from gateway G1 to gateway G2 may be a shorter or faster route (compared to route 152) available when taking a further navigation data set into account, route 151 (in contrast to route 152) is not a possible route for which cost data is stored in CT101, as in that case the route and therefore the cost data CD101 would depend on a navigation data set other than navigation data set 101.

In the following, it is assumed that Dijkstra's algorithm is used as a basis for determining a route. In the scope of the invention, a route determination may however also be achieved by other methods or algorithms. Generally, the Dijkstra's algorithm is an algorithm for finding the shortest paths between a starting node and a destination node in a graph. Assuming a start at the initial node and assuming the distance of node Y to be the distance from the initial node to Y. The algorithm then tries to improve initial distance values step by step in the following manner:

1. Assign to every node a tentative distance value (e.g. set it to zero for our starting node and to infinity for all other nodes).
2. Set the starting node as current the current node. Mark all other nodes "unvisited". Create a set of all the unvisited nodes (e.g. the unvisited set).
3. For the current node, consider all of its unvisited neighbours and calculate their tentative (i.e. hitherto) distances. Compare the newly calculated tentative distance to the current assigned value and assign the smaller one. For example, if the current node A is marked with a distance of 6, and the edge connecting it with a neighbour B has length 2, then the distance to B (through A) will be 6+2=8. If B was previously marked with a distance greater than 8, then change it to 8. Otherwise, keep the current value.

4. After considering all of the neighbours of the current node, mark the current node as "visited" and remove it from the unvisited set. A visited node will not be checked again.
5. If the destination node has been marked "visited" (e.g. when planning a route between two specific nodes) or if the smallest tentative distance among the nodes in the unvisited set is infinity (e.g. when planning a complete traversal; occurs when there is no connection between the initial node and remaining unvisited nodes), then stop. The algorithm has finished.
6. Otherwise, select the unvisited node that is marked with the smallest tentative distance, set it as the new "current node", and go back to step 3.

Gateways and/or routing nodes of navigation data sets may be such nodes, so that the above algorithm can be used for determining a route. In particular, this algorithm also works with other types of costs than a distance.

Figure 6:
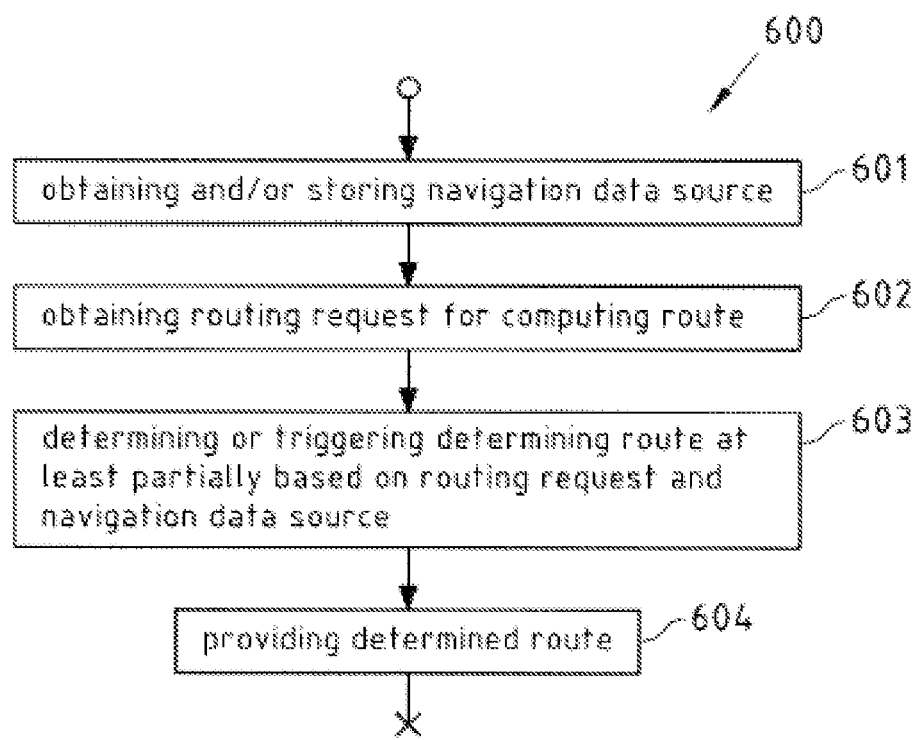
FIG. 6 is a flowchart of an exemplary embodiment of a method according to the second aspect of the invention.

FIG. 3a-3d show exemplary maps M101, M102, M103, M104 of different geographic regions R101, R102, R103, R104 represented by navigation data sets (e.g. navigation data sets 101, 102, 103, 104 of FIG. 1). FIG. 3a-3d illustrate a determination of a route. Reference will also be made to FIG. 6, FIG. 6 showing a flowchart 600 of an exemplary embodiment of a method according to the second aspect of the invention.

After a navigation data source (e.g. navigation data source 100 of FIG. 1) is obtained and stored, e.g. at a navigation device (action 601 of FIG. 6), a routing request defining a starting node S and a destination node D is obtained (action 602 of FIG. 6). Based on the routing request and the navigation data source, a route can now be determined (action 603 of FIG. 6) in the following manner.

Figure 3A:
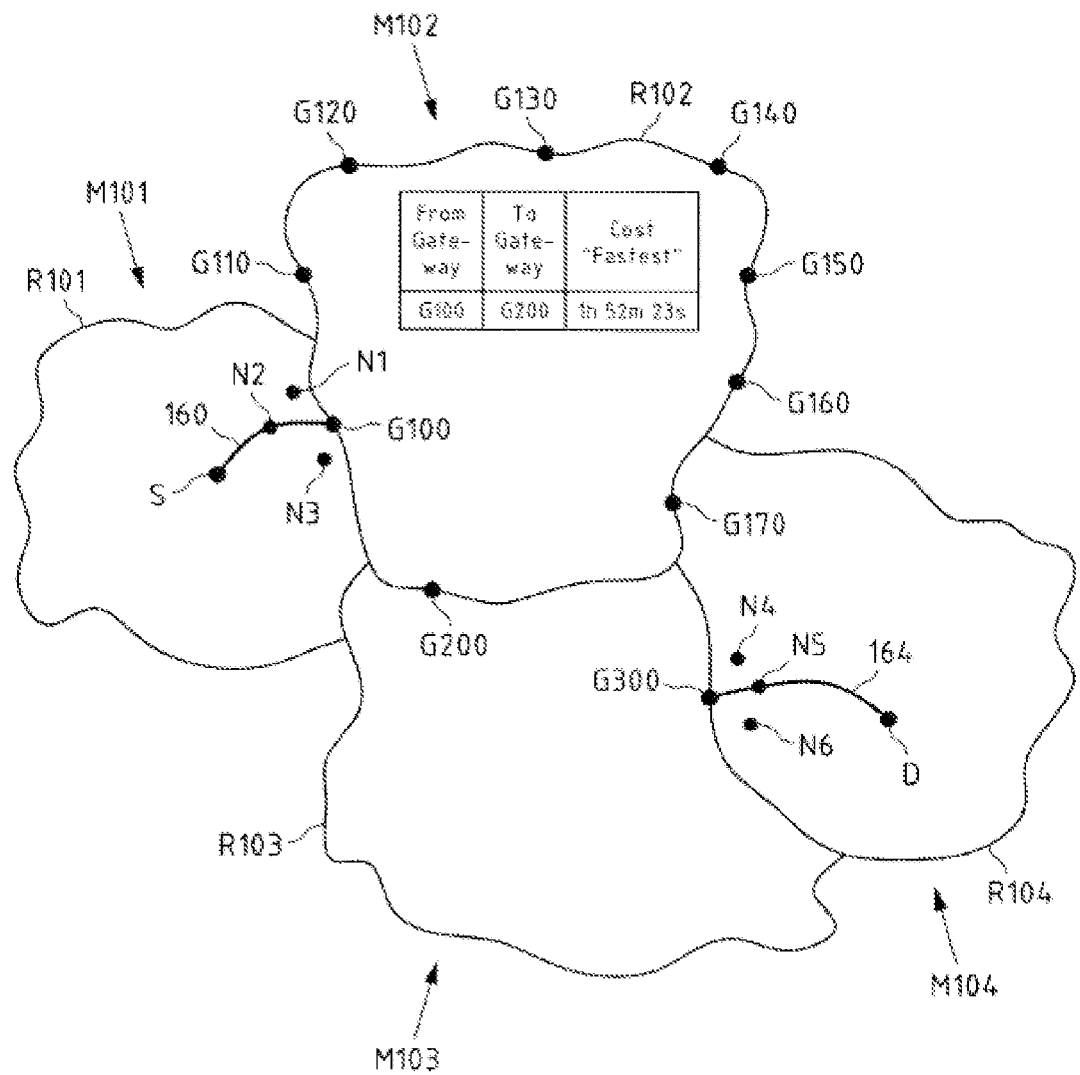
FIG. 3a-3d show exemplary maps of different geographic regions represented by navigation data sets illustrating a determination of a route.

With respect to FIG. 3a, the routing starts at a node S (e.g. a routing node) of (starting) navigation data set 101 and associated with a starting position located in the geographic region R101. The routing algorithm uses nodes from the navigation data set 101 for determining sub-route 160. At some point, the algorithm reaches the border of the geographic region R101. The gateway node G100 is stored in the list of visited nodes. At some point, gateway G100 becomes the "current node". At this point, the route with the preferred cost (e.g. the lowest cost such as the shortest distance) between node S and gateway G100 is known which is indicated by sub-route 160 between node S and gateway G100. When gateway G100 becomes the current node the algorithm does not need any data from navigation data set 102 representing map M102 of geographic region R102, but rather only considers the gateways G110-G200 of geographic region R102. Thus, the neighbours of G100 are only nodes N1, N2, N3 located in the geographic region R101 or gateways of geographic region R102. No internal nodes of geographic region R102 need to be considered as neighbouring nodes. The tentative costs of the neighbouring gateways G110-G200 are equal to the cost of G100 plus the respective cost value between G100 and G110-G200 as stored in the cost data set CT102, a part of which is also illustrated in FIG. 3a. The routing algorithm continues at some point with G200, i.e. G200 becomes the current node. At this point in time, it is not known which exact nodes in the geographic region R102 are used. For G200 the neighbouring nodes are only the gateways of geographic region R103 which means that G300 is added as neighbouring node. At some point, G300 becomes the current node and its neighbouring nodes are internal nodes N4, N5, N6 of the geographic region R104. When one of these nodes becomes the current node, the algorithm continues as described before. The algorithm ends when the destination node D becomes the current node.

At this point the route consists of the sub-route 160 between node S and gateway G100, the gateways G100, G200, G300 and the sub-route 163 between gateway G300 and node D. In other words, the routing path is only known in the geographic regions 8101 and R104. In between, the gateways G100, G200 and G300 provide it supporting nodes.

Figure 3B:
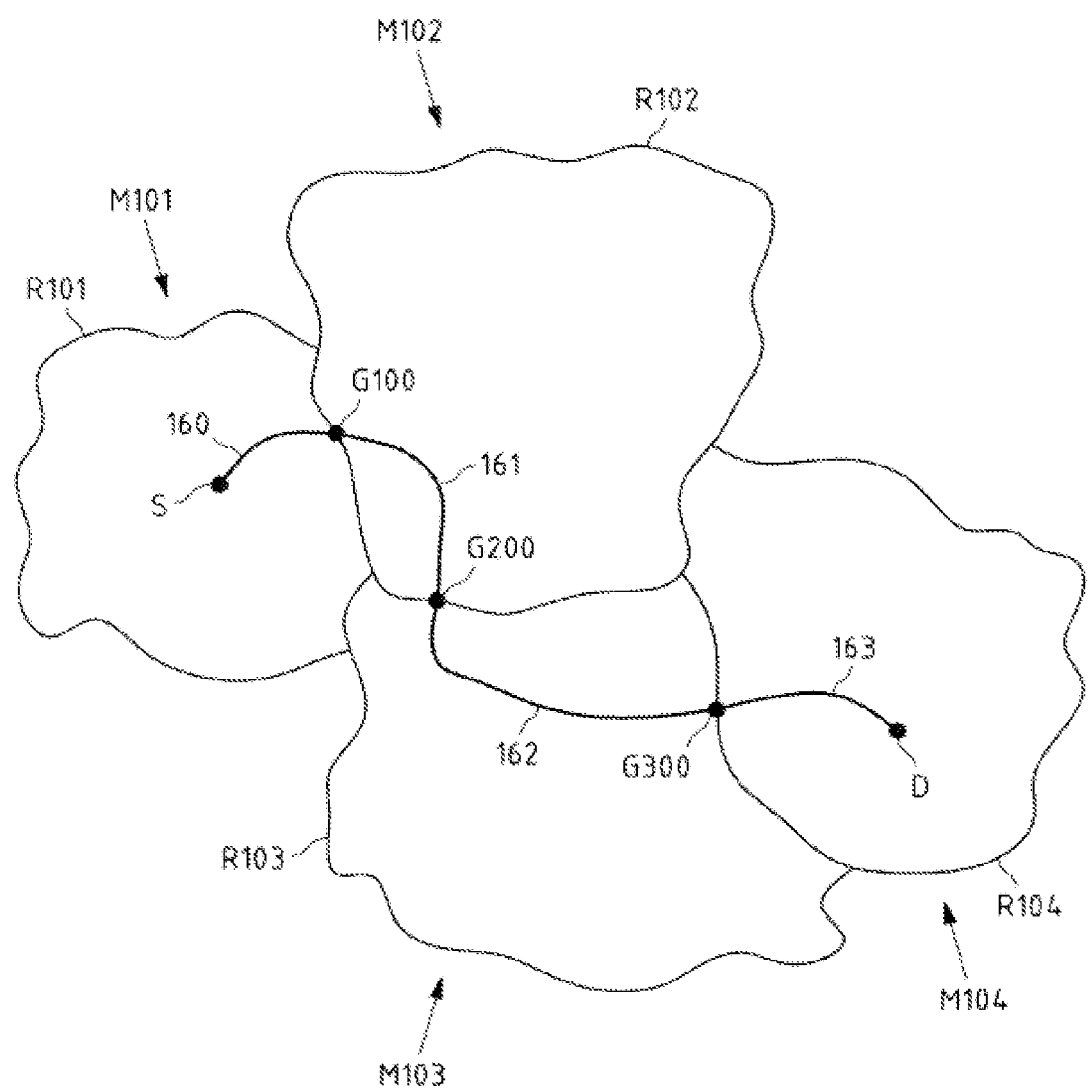

In order to find the optimal route, the algorithm is carried out for a route from gateway G100 to gateway G200 in geographic region R102 by only using data of corresponding navigation data set 102. Similarly, a route is determined from gateway G200 to gateway G300 in geographic region R103 by only using data from corresponding navigation data set 103. The final result, i.e. the determined route comprising sub-routes 160, 161, 162, 163 is depicted in FIG. 3b.

The determined route can then be provided (action 604 of FIG. 6), e.g. output on a display of a navigation device.

Figure 3C:
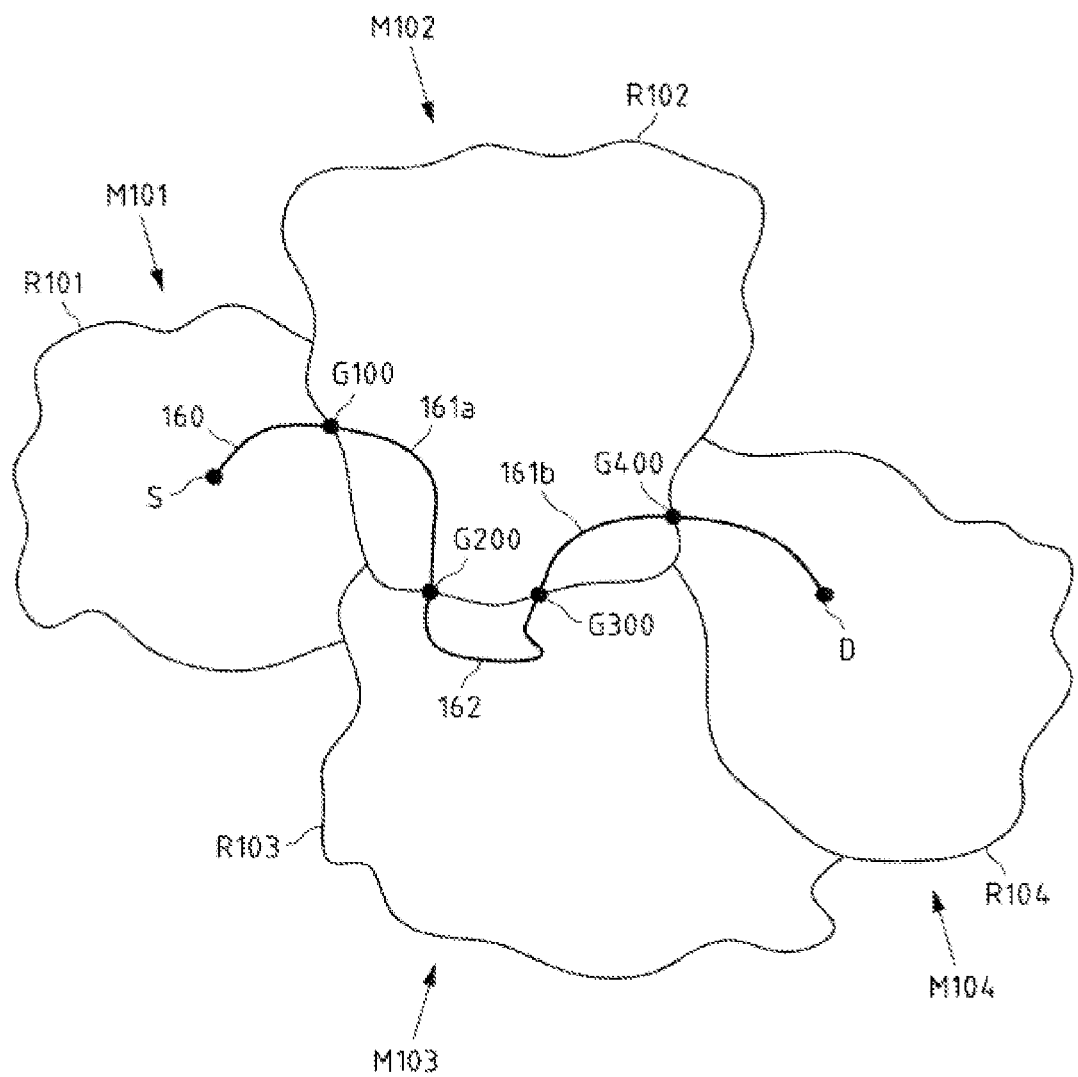

FIG. 3c illustrates an exemplary result of a determination of a route with a more complex route path. It is shown that the optimal route leaves geographic region R101 and later enters it again. The algorithm would again first compute the sub-routes 160, 163 in geographic region R101 and R104 in addition to the gateways G100, G200 and G300. In contrast to before, we would have to compute two sub-routes in geographic region R102, i.e. first from gateway G100 to G200 and also from gateway G300 to G400.

Figure 3D:
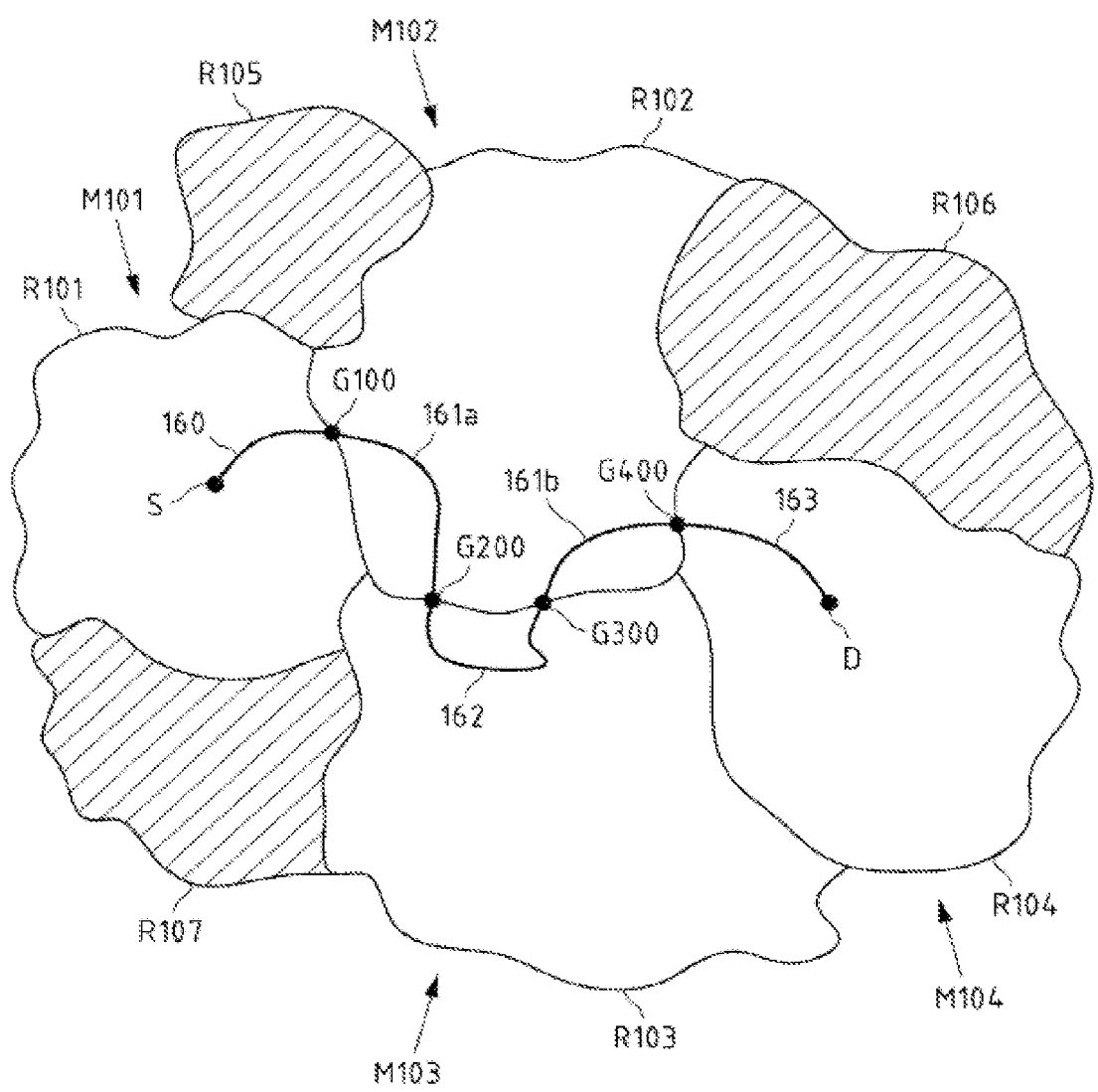

An advantage is that this algorithm does not need to access navigation data sets representing maps of geographic regions which are not part of the final route path. This is illustrated by FIG. 3d. The navigation data sets (e.g. navigation data, routing nodes and/or routing links stored therein) representing a map of the hatched geographic regions R105, R106, R107 are never accessed. Only the cost data sets associated with these navigation data sets (and thus these regions) might be used, but not the navigation data itself. Navigation data only needs to be accessed from those navigation data sets representing maps of geographic regions which contribute to the final route path (i.e. navigation data sets 101, 102, 103, 104).

This is especially advantageous if the navigation data source 100 comprises many navigation data sets representing maps of small geographic regions. In this case, it is advantageous to load and evaluate the smallest possible amount of data. By using the method outlined above, the amount of read data can be minimized.

The method described with respect to FIG. 3 can be further improved by reducing the search space, if the navigation data source, in particular the cost data sets, also comprise gateway position data representing a (geographic) position associated with a respective gateway, e.g. by comprising geographic coordinates such as a specific pairing of latitude and longitude for each gateway. For instance, the navigation data source (e.g. the cost data set) may comprise a table or additional entries in the structure of (Gateway, Latitude, Longitude).

This allows for using an A* algorithm. In comparison to Dijkstra's algorithm used above with reference to FIG. 3, not only the smallest tentative cost Dist1 (i.e. the cost from the starting node to the next potential current node) is taken into consideration for choosing the next "current node" (confer step 3 above) but also an estimate of the remaining cost to the destination node, e.g. the (Euclidean) distance Dist2 of the node to the destination node. The node for which the sum of these two values, i.e. Dist1+Dist2, is minimal is chosen as next "current node". This may reduce the search space considerably. Transferring this to the method described with respect to FIG. 3, means that from a current gateway Gi a neighbouring gateway Gj is chosen as the next current node if the cost from starting node to current node Gi plus the cost from Gi to Gj (provided by the cost data set) plus the cost (e.g. the (Euclidean) distance) from Gj to the destination node D (the position of which is known) is minimal. As the position of the gateway Gj can easily be read from the gateway position data, the cost (e.g. the (Euclidean) distance) from Gj to the destination node can easily be determined.

Figure 4A:
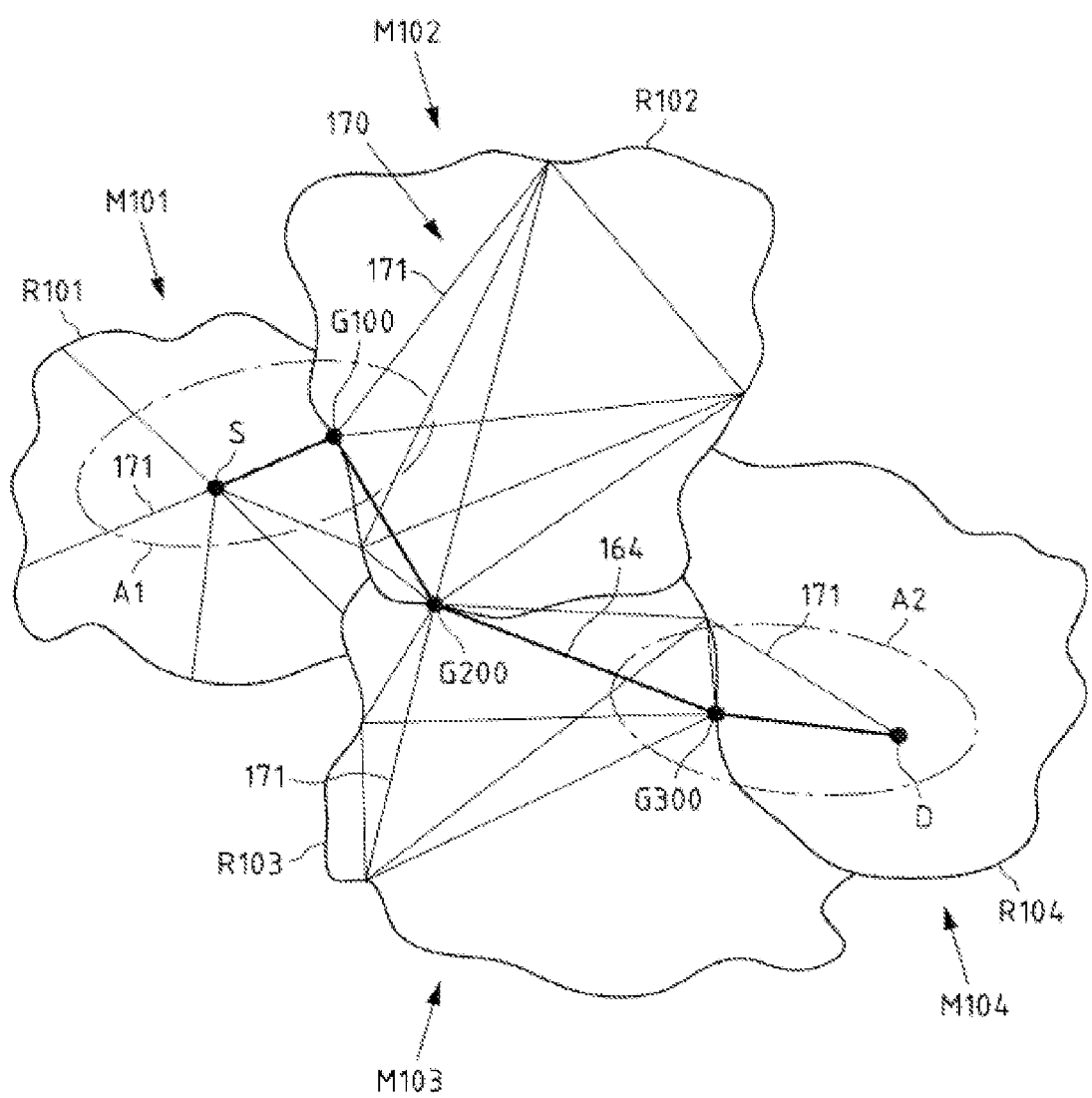
FIG. 4a, 4b show exemplary maps of different geographic regions represented by navigation data sets illustrating a determination of a route.
Figure 4B:
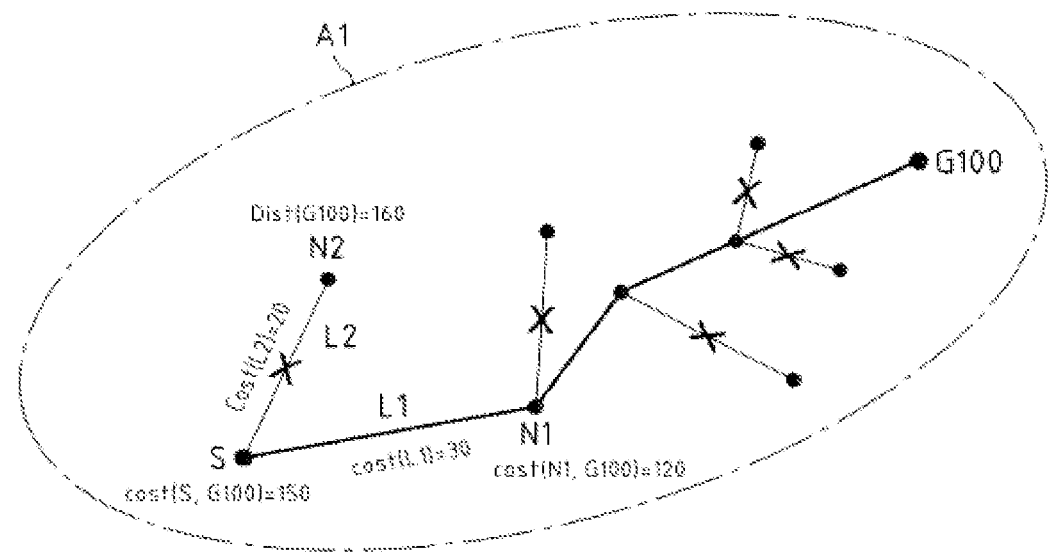
Figure 4B:
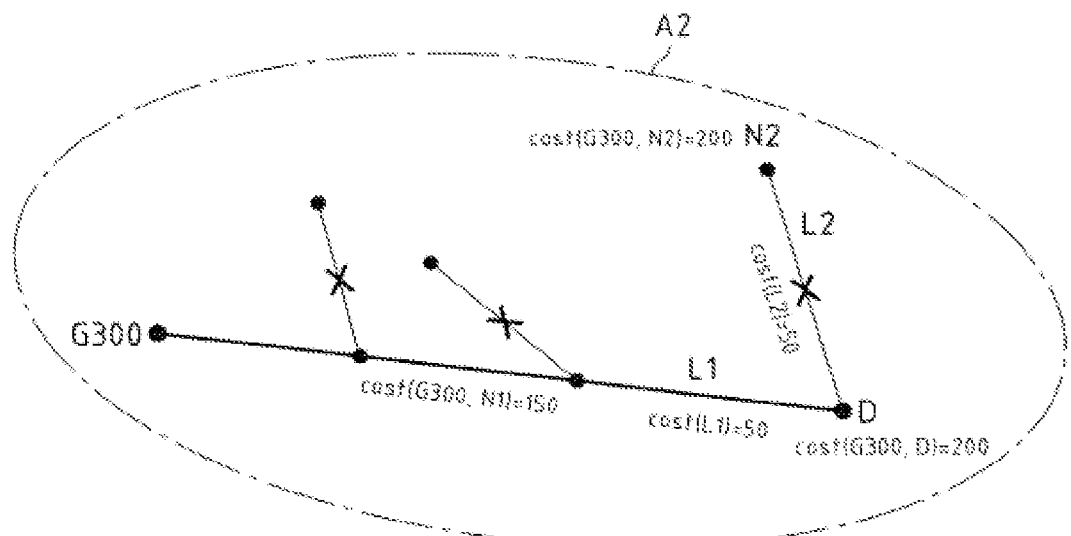

Turning now to FIG. 4a, 4b, a further example or improvement of determining a route is illustrated. FIG. 4a shows exemplary maps M101-M104 of different geographic regions R101-R104 represented by navigation data sets 101-104. Determining the route in this case makes use of landmark-based routing with respect to gateways.

While the A* algorithm uses the (Euclidean) distance as a lower bound for the cost between starting node S and the destination node D, a landmark-based algorithm can further improve these lower bounds, i.e. provide higher values, to further reduce the overall search space. In order to improve these improved lower bound values, a landmark-based routing uses so called landmarks and the triangle inequality to compute feasible lower bounds. For this, a (small) subset of nodes are selected as landmarks. For each node in the graph, pre-determined costs to and from every landmark are stored. This information can be used to compute lower bounds in the following manner: considering a landmark L and defining d as the cost (e.g. the distance) between two points, then, by the triangle inequality, $d(S;L)-d(D,L) \leq d(S,D)$; and $d(L,D)-d(L,S) \leq d(S,D)$. To get the tightest lower bound, one can take the maximum of these lower bounds over all available landmarks.

If gateways are used as landmarks, it can be achieved that the routing algorithm only follows links during route computations which belong to the final route. For this, node cost data is provided for routing nodes of a navigation data set. The node cost data defines for possible combinations of routing nodes and gateways defined by the navigation data set a cost value each. The cost value indicates a cost for a route between the respective routing node and the respective gateway. For instance, for each non-bivalent node the cost to and from all landmarks (i.e. gateways) of a respective geographic region is provided.

First, a preliminary route 164 is computed as a set of supporting nodes (in this case starting node S, gateways G100, G200, G300 and destination node D) providing a routing network 170 as depicted in FIG. 4a. Basically, in the geographic region R101 a map M101 of which is represented by a (starting) navigation data set 101, the preliminary routing network consists of links 171 from the starting node S to the gateways of this geographic region R101. Similarly, in the geographic region R104 a map M104 of which is represented by a (destination) navigation data set 104, the links are direct links from the gateways to the destination node D. The cost of these links is the cost from the starting node S to the respective gateways and from the respective gateways to the destination node D, respectively. These costs can be taken from the node cost data. This approach differs from the approach described with respect to FIG. 3. The routing network of the geographic regions R102, R103 in between, in this approach consists of links between the gateways of the geographic regions in between. This approach is similar to from the approach described with respect to FIG. 3. The cost of these links can be taken from the respective cost data sets.

Based on this preliminary route 164, a route from starting node S to destination node D can be computed efficiently by mapping this preliminary route based on the supporting nodes to a route comprising navigation data (e.g. routing nodes and/or routing links) of the navigation data sets of the navigation data source can be done in a straightforward way based on the costs to and/or from the gateways for respective nodes on the route from the node cost data. The costs may be stored for each non-bivalent node in a binary encoded way. For instance, for the geographic region R101 and the geographic regions R102, R103 in between, we only need the costs to the respective gateways, whereas for the geographic region R104 we need the cost from the gateway.

In this regard, FIG. 4b depicts this mapping process for areas A1 and A2 of FIG. 4a. For A1, starting the route at starting node S, your cost to gateway G100 is 150, which is known from the node cost data. Then, following the links L1, L2 from starting node S the cost at the next node N1, N2 should be cost(S, G100)–cost(link). If this is not the case, you can discard this link (e.g. link L2). So from each node you can directly follow one link (e.g. link L1), i.e. you are directed straight to the gateway G100. The same holds for traversing the geographic regions R102, R103 in between. You are directly guided to the right gateway G200 and G300, respectively. In the geographic region R104, the situation is different in the sense that you need the cost from a gateway or node to be directed straight to the destination node D. But in all cases, based on the costs stored for each (non-bivalent) node, the algorithm is directly guided.

To reduce necessary storage space, the cost values to and from the gateways might only be used for navigation data sets representing a map with a sufficiently low level of detail or for higher level functional road class links, e.g. storing node cost data only at nodes which are at least connected to a link of functional road of a certain class.

FIG. 5a is a block diagram of an exemplary embodiment of a server 300 according to the first and third aspects of the invention.

Server 300 comprises a processor 301. Processor 301 may represent a single processor or two or more processors, which are for instance at least partially coupled, for instance via a bus. Processor 301 executes a program code stored in program memory 302 (for instance program code causing server 300 to perform one or more of the embodiments of a method (or parts thereof) according to the first aspect of the, when executed on processor 301), and interfaces with a main memory 303. Some or all of memories 302 and 303 may also be included into processor 301. One of or both of memories 302 and 303 may be fixedly connected to processor 301 or at least partially removable from processor 301, for instance in the form of a memory card or stick. Program memory 302 may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. Program memory 302 may also comprise an operating system for processor 301. Program memory 302 may for instance comprise a first memory portion that is fixedly installed in server 300, and a second memory portion that is removable from server 300, for instance in the form of a removable SD memory card. Main memory 303 may for instance be a volatile memory. It may for instance be a DRAM memory, to give non-limiting example. It may for instance be used as a working memory for processor 301 when executing an operating system and/or programs.

Processor 301 further controls a communication interface 304 configured to receive and/or output data and/or information. For instance, communication interface 304 may be configured to communicate with a navigation device 400 (see FIGS. 5b and 5c). This may for instance comprise receiving information such as requests from the navigation device 400 and/or transmitting information such as a computed route and/or navigation data (e.g. one or more navigation data sets, one or more cost data sets and/or a navigation data source) to the navigation device 400. The communication may for instance be based on a wireless communication connection. The communication interface 304 may thus comprise circuitry such as modulators, filters, mixers, switches and/or one or more antennas to allow transmission and/or reception of signals, e.g. for the communication with navigation device 400. In embodiments of the invention, communication interface 304 is inter alia configured to allow communication according to a 2G/3G/4G/5G cellular communication system and/or a non-cellular communication system, such as for instance a WLAN network. Nevertheless, the communication connection between server 300 and navigation device 400 may equally well at least partially comprise wire-bound portions. For instance, server 300 may be connected to a back-bone of a wireless communication system (associated with navigation device 400) via a wire-bound system such as for instance the Internet.

The components 302-306 of server 300 may for instance be connected with processor 301 by means of one or more serial and/or parallel busses.

FIG. 5b is a block diagram of an exemplary embodiment of a navigation device 400 according to the second and third aspects of the invention. For instance, the navigation device 400 is or forms a part (e.g. as a module) of a GNSS-enabled smartphone or a navigation device of a vehicle.

Navigation device 400 comprises a processor 401. Processor 401 may represent a single processor or two or more processors, which are for instance at least partially coupled, for instance via a bus. Processor 401 executes a program code stored in program memory 402 (for instance program code causing navigation device 400 to perform one or more of the embodiments of a method (or parts thereof) according to the second aspect of the invention, when executed on processor 401), and interfaces with a main memory 403. Some or all of memories 402 and 403 may also be included into processor 401. One of or both of memories 402 and 403 may be fixedly connected to processor 401 or at least partially removable from processor 401, for instance in the form of a memory card or stick. Program memory 402 may for instance be a non-volatile memory. In program memory 402, a navigation data source such as navigation data source 100 may be stored. Program memory 402 may also comprise an operating system for processor 401. Program memory 402 may for instance comprise a first memory portion that is fixedly installed in navigation device 400, and a second memory portion that is removable from navigation device 400, for instance in the form of a removable SD memory card. Main memory 403 may for instance be a volatile memory. It may for instance be used as a working memory for processor 401 when executing an operating system and/or programs.

Processor 401 further controls a communication interface 404 configured to receive and/or output data and/or information. For instance, communication interface 404 may be configured to communicate with the server 300 as described above. The communication may for instance be based on a wireless communication connection. The communication interface 404 may thus comprise circuitry such as modulators, filters, mixers, switches and/or one or more antennas to allow transmission and/or reception of signals, e.g. for the communication with navigation device 400. In embodiments of the invention, communication interface 404 is inter alia configured to allow communication according to a 2G/3G/4G/5G cellular communication system and/or a non-cellular communication system, such as for instance a WLAN network. Nevertheless, the communication connection between server 300 and navigation device 400 may equally well at least partially comprise wire-bound portions.

Processor 401 further controls a user interface 405 configured to present information to a user of navigation device 400 and/or to receive information from such a user. User interface 405 may for instance be the standard user interface via which a user of navigation device 400 controls other functionality thereof, such as finding/searching a destination position, entering a routing request, providing a cost preference etc. An example for such a user interface is a touch sensitive display.

Processor 401 may further control an optional GNSS interface 406 configured to receive positioning information of an GNSS such as Global Positioning System (GPS), Galileo, Global Navigation Satellite System (i.e. "Globalnaja Nawigazionnaja Sputnikowaja Sistema", GLONASS) and Quasi-Zenith Satellite System (QZSS).

The components 402-406 of navigation device 400 may for instance be connected with processor 401 by means of one or more serial and/or parallel busses.

Figure 5C:
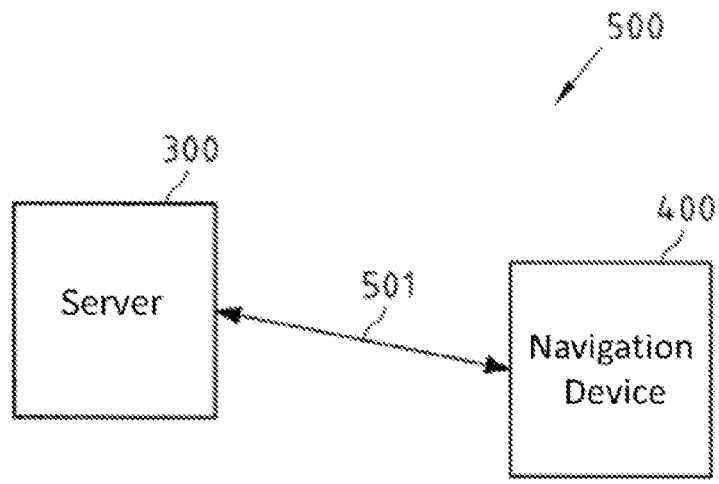
FIG. 5c is a block diagram of an exemplary embodiment of a navigation system according to the third aspect of the invention.

FIG. 5c is a block diagram of an exemplary embodiment of a navigation system 500 according to the third aspect of the invention. System 500 comprises a server represented by server 300 and a navigation device represented by navigation device 400 as described above.

As illustrated in FIG. 5c, server 300 may communicate via communication connection 501 with navigation device 400. Communication connection 501 may be a bi-directional connection. Communication connection 501 may be a wireless communication connection such as a cellular-connection (e.g. a connection in a 2G/3G/4G/5G communication system) and/or a non-cellular connection (e.g. a connection in a non-cellular communication system, such as for instance a WLAN network). Nevertheless, communication connection 501 may equally well at least partially comprise wire-bound portions. For example, server 300 may be connected to a back-bone of a wireless communication system (associated with navigation device 400, i.e. the navigation device) via a wire-bound system such as for instance the internet or a local area network (LAN, e.g. an Ethernet).

Figure 7:
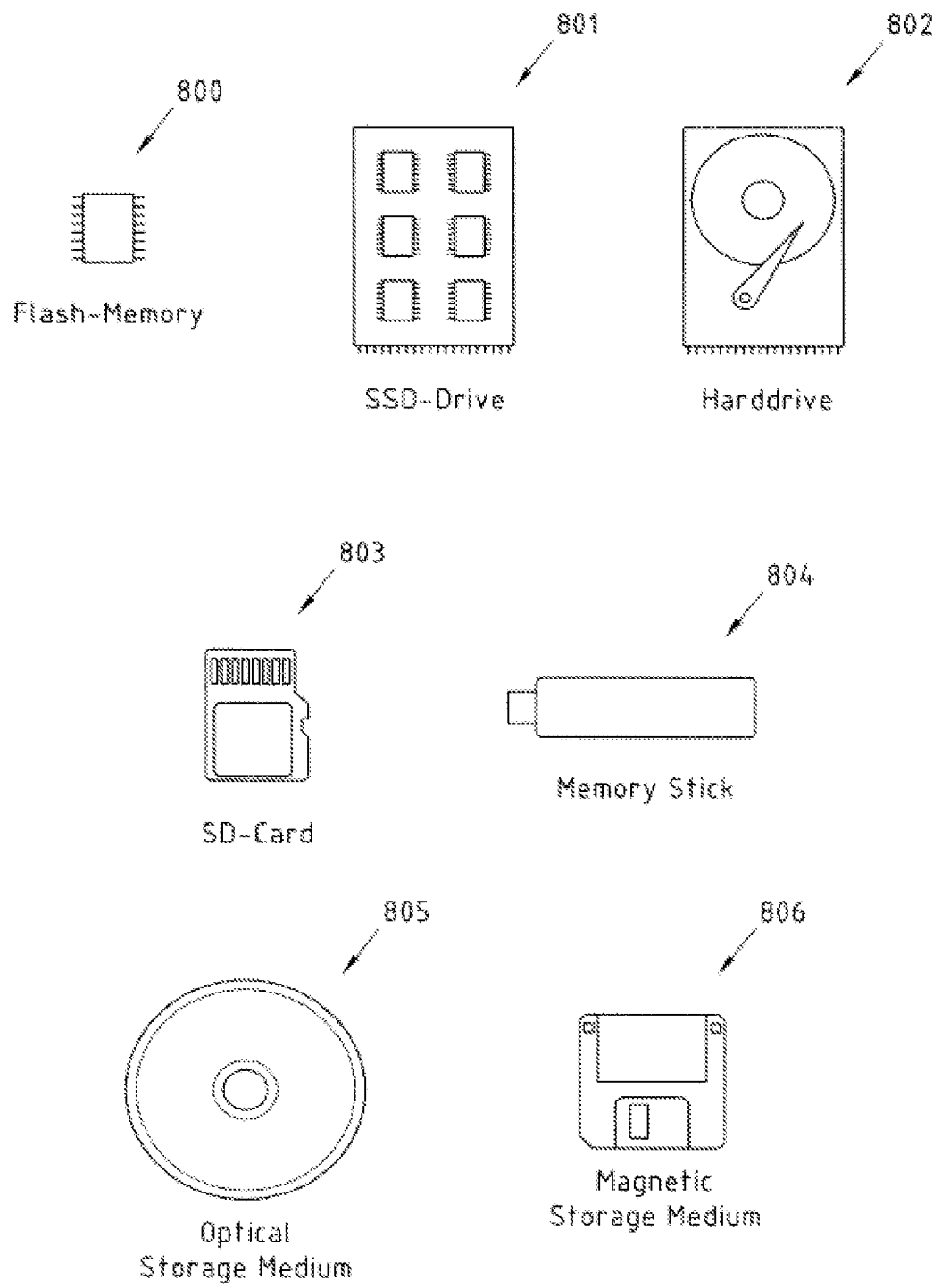
FIG. 7 is a schematic illustration of examples of tangible storage media according to the present invention.

FIG. 7 is a schematic illustration of examples of tangible computer-readable storage media according to the present invention that may for instance be used to implement program memory 302 of FIG. 5a and/or program memory 402 of FIG. 5b. To this end, FIG. 7 displays a flash memory 800, which may for instance be soldered or bonded to a printed circuit board, a solid-state drive 801 comprising a plurality of memory chips (e.g. Flash memory chips), a magnetic hard drive 802, a Secure Digital (SD) card 803, a Universal Serial Bus (USB) memory stick 804, an optical storage medium 805 (such as for instance a CD-ROM or DVD) and a magnetic storage medium 806.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 300 and 400 of FIGS. 5a and 5b, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The above approaches make it possible to speed up routing. In particular, there is no need to change any internal data of the navigation data sets. The cost data table can be derived from the data included in the specific navigation data set by an application-specific post-process and stored separately from the navigation data sets. It is especially advantageous that updating a navigation data set does not require changing any pre-computed cost data sets associated with other navigation data sets. The presented approach is robust, rather easy to implement and allows fast routing in combination with navigation data sets representing maps of small regions which are desirable for bandwidth-optimized incremental updates.

The invention claimed is:

1. A computer program product comprising a non-transitory computer readable storage medium having program code portions stored thereon, the program code portions configured, upon execution by at least one processor, to:
   create at least one cost data set associated with a navigation data set for a navigation data source, said navigation data source comprising:
   a cost data set associated with a navigation data set, said navigation data set representing a map of a geographic region and defining a plurality of gateways, each gateway of said plurality of gateways being associated with a position at said geographic region and being associable with a gateway of a further navigation data set representing a map of a further geographic region, wherein the map of the geographic region and the map of the further geographic region are each renderable via a display device, wherein the map of the geographic region and the map of the further geographic region each comprise coordinate data associated with a global navigation satellite system,
   wherein said cost data set comprises cost data and cost threshold data, said cost data defining for at least a part of possible gateway pairs of said plurality of gateways at least a cost value, each cost value indicating a cost for a route between gateways of a respective gateway pair, and wherein the cost threshold data defines a maximum cost used for validation of the navigation data set.

2. The computer program product according to claim 1, wherein at least a part of said gateways of said plurality of gateways is associated with a position at a border of said geographic region a map of which is represented by said navigation data set.

3. The computer program product according to claim 1, wherein said geographic region and said respective further geographic region are at least partially adjacent regions.

4. The computer program product according to claim 1, wherein said navigation data source comprises a plurality of cost data sets each associated with a respective navigation data set.

5. The computer program product according to claim 1, wherein said cost data set further comprises at least one of:
   gateway key data indicating one or both gateways of the respective gateway pair for a respective cost value, or
   gateway position data representing a position associated with a respective gateway defined by a respective navigation data set;
wherein cost values indicate a cost of one or more of the following types:
   a time cost for a respective route between the respective gateway pair;
   a length cost for the respective route between the respective gateway pair;
   a monetary cost for the respective route between the respective gateway pair;
   a scenic cost for the respective route between the respective gateway pair; or
   a desirability cost for the respective route between the respective gateway pair.

6. The computer program product according to claim 1, wherein said cost data defines for at least a part of said gateway pairs multiple cost values each, each cost value of said multiple cost values indicating a cost of a different type;

wherein said cost data comprises respective cost values for a respective route between the respective gateway pair;

wherein said cost data comprises a cost value for each possible gateway pair of the plurality of gateways and for each provided cost type.

7. The computer program product according to claim 1, wherein said cost data of said cost data set associated with said navigation data set is independent of information from other navigation data sets.

8. The computer program product according to claim 1, wherein said cost data of said cost data set associated with said navigation data set is only based on information from said navigation data set.

9. The computer program product according to claim 1, wherein said navigation data set further comprises:
a plurality of routing nodes, and
node cost data, said node cost data defining for at least a part of possible combinations of a respective routing node and a gateway defined by said navigation data set a cost value each, said cost value indicating a cost for a route between said respective routing node and said respective gateway.

10. The computer program product according to claim 1, wherein said navigation data source further comprises
at least one further navigation data set.

11. The computer program product according to claim 1, wherein said navigation data source comprises multiple navigation data sets representing maps with different levels of detail, wherein a cost data set is only associated with a respective navigation data set in case a level of detail of a map represented by said respective navigation data set is less than a predefined threshold.

12. A method, performed by at least one apparatus, said method comprising:
creating, by at least one processor, at least one cost data set associated with a navigation data set for a navigation data source, said navigation data source comprising:
a cost data set associated with a navigation data set, said navigation data set representing a map of a geographic region and defining a plurality of gateways, each gateway of said plurality of gateways being associated with a position at said geographic region and being associable with a gateway of a further navigation data set representing a map of a further geographic region, wherein the map of the geographic region and the map of the further geographic region are each renderable via a display device, wherein the map of the geographic region and the map of the further geographic region each comprise coordinate data associated with a global navigation satellite system,
wherein said cost data set comprises cost data and cost threshold data, said cost data defining for at least a part of possible gateway pairs of said plurality of gateways at least a cost value (CV), each cost value indicating a cost for a route between gateways of a respective gateway pair, and wherein the cost threshold data defines a maximum cost used for validation of the navigation data set.

13. The method according to claim 12, said method further comprising:
checking a validity of a navigation data set by comparing the created cost data set or a part thereof associated with said navigation data set with a cost data set or a part thereof associated with a previous version of said navigation data set.

14. A method, performed by at least one apparatus, said method comprising:
obtaining or storing a navigation data source, said navigation data source comprising:
a cost data set associated with a navigation data set, said navigation data set representing a map of a geographic region and defining a plurality of gateways, each gateway of said plurality of gateways being associated with a position at said geographic region and being associable with a gateway of a further navigation data set representing a map of a further geographic region, wherein the map of the geographic region and the map of the further geographic region are each renderable via a display device, wherein the map of the geographic region and the map of the further geographic region each comprise coordinate data associated with a global navigation satellite system,
wherein said cost data set comprises cost data and cost threshold data, said cost data defining for at least a part of possible gateway pairs of said plurality of gateways at least a cost value, each cost value indicating a cost for a route between gateways of a respective gateway pair, and wherein the cost threshold data defines a maximum cost used for validation of the navigation data set;
obtaining, by at least one processor, a routing request for computing a route, wherein said routing request at least defines a starting position and a destination position for said route;
determining, by the at least one processor, said route at least partially based on said routing request and said navigation data source, wherein said route crosses at least one geographic region from one gateway to another gateway defined by a navigation data set of said navigation data source; and
providing, by the at least one processor, said determined route.

15. The method according to claim 14, wherein determining said route comprises:
determining at least one gateway to be on said route and defined by a navigation data set representing a map of a geographic region to be crossed from gateway to gateway by said route at least partially based on a respective cost data set associated with said navigation data set.

16. The method according to claim 14, wherein determining said route comprises:
determining, for every navigation data set representing a map of a geographic region to be crossed from gateway to gateway by said route, at least one gateway to be on said route and defined by a respective navigation data set at least partially based on a respective cost data set associated with a respective navigation data set.

17. The method according to claim 14, wherein a starting navigation data set represents a map of a geographic region comprising said starting position;
wherein a destination navigation data set represents a map of a geographic region comprising said destination position; and
wherein determining said route comprises at least one of:
determining a sub-route from said starting position to a gateway defined by said starting navigation data set;
determining a sub-route from a gateway of said destination navigation data set to said destination position; or determining a sub-route between a gateway pair defined by a navigation data set representing a map of a geographic region to be crossed from gateway to gateway by said route.

18. The method according to claim 17, wherein one or more of said sub-routes is determined at least partially based on node cost data of a respective navigation data set.

19. An apparatus, said apparatus comprising:
at least one processor; and
at least one memory including computer program code;
wherein said at least one memory and said computer program code are configured to, with said at least one processor, cause said apparatus to at least perform a method, said method comprising:
creating at least one cost data set associated with a navigation data set for a navigation data source, said navigation data source comprising:
a cost data set associated with a navigation data set, said navigation data set representing a map of a geographic region and defining a plurality of gateways, each gateway of said plurality of gateways being associated with a position at said geographic region and being associable with a gateway of a further navigation data set representing a map of a further geographic region, wherein the map of the geographic region and the map of the further geographic region are each renderable via a display device, wherein the map of the geographic region and the map of the further geographic region each comprise coordinate data associated with a global navigation satellite system,
wherein said cost data set comprises cost data and cost threshold data, said cost data defining for at least a part of possible gateway pairs of said plurality of gateways at least a cost value, each cost value indicating a cost for a route between gateways of a respective gateway pair, and wherein the cost threshold data defines a maximum cost used for validation of the navigation data set.

20. An apparatus, said apparatus comprising:
at least one processor; and
at least one memory including computer program code;
wherein said at least one memory and said computer program code are configured to, with said at least one processor, cause said apparatus to at least perform a method, said method comprising:
obtaining or storing a navigation data source, said navigation data source comprising:
a cost data set associated with a navigation data set, said navigation data set representing a map of a geographic region and defining a plurality of gateways, each gateway of said plurality of gateways being associated with a position at said geographic region and being associable with a gateway of a further navigation data set representing a map of a further geographic region, wherein the map of the geographic region and the map of the further geographic region are each renderable via a display device, wherein the map of the geographic region and the map of the further geographic region each comprise coordinate data associated with a global navigation satellite system,
wherein said cost data set comprises cost data and cost threshold data, said cost data defining for at least a part of possible gateway pairs of said plurality of gateways at least a cost value (CV), each cost value indicating a cost for a route between gateways of a respective gateway pair, and wherein the cost threshold data defines a maximum cost used for validation of the navigation data set;
obtaining a routing request for computing a route, wherein said routing request at least defines a starting position and a destination position for said route;
determining said route at least partially based on said routing request and said navigation data source, wherein said route crosses at least one geographic region from one gateway to another gateway defined by a navigation data set of said navigation data source; and
providing said determined route.

* * * * *

UNITED STATES PATENT AND TRADEMARK OFFICE
CERTIFICATE OF CORRECTION

PATENT NO. : 11,029,162 B2  
APPLICATION NO. : 16/306939  
DATED : June 8, 2021  
INVENTOR(S) : Pfeifle et al.

Page 1 of 1

It is certified that error appears in the above-identified patent and that said Letters Patent is hereby corrected as shown below:

In the Claims

<u>Column 27,</u>  
Line 3, Claim 6 "pair;" should read --pair; or--.

Signed and Sealed this  
Seventeenth Day of May, 2022

Katherine Kelly Vidal  
*Director of the United States Patent and Trademark Office*